(12) United States Patent
Munsee et al.

(10) Patent No.: US 10,457,243 B2
(45) Date of Patent: Oct. 29, 2019

(54) KNEE AIRBAG ASSEMBLIES

(71) Applicant: Autoliv ASP, Inc., Ogden, UT (US)

(72) Inventors: Matthew Lee Munsee, Morgan, UT (US); Travis Brent Hess, Farr West, UT (US); Gavin Francom Anae, Kaysville, UT (US); Eric M. Heitkamp, Dublin, OH (US)

(73) Assignees: Autoliv ASP, Inc., Ogden, UT (US); Honda Motor Co. Ltd., Tokyo (JP)

( * ) Notice: Subject to any disclaimer, the term of this patent is extended or adjusted under 35 U.S.C. 154(b) by 82 days.

(21) Appl. No.: 15/610,954

(22) Filed: Jun. 1, 2017

(65) Prior Publication Data

US 2018/0345899 A1 Dec. 6, 2018

(51) Int. Cl.
*B60R 21/233* (2006.01)
*B60R 21/239* (2006.01)
*B60R 21/231* (2011.01)
*B60R 21/00* (2006.01)

(52) U.S. Cl.
CPC .......... *B60R 21/233* (2013.01); *B60R 21/239* (2013.01); *B60R 2021/0051* (2013.01); *B60R 2021/0053* (2013.01); *B60R 2021/23169* (2013.01); *B60R 2021/23308* (2013.01); *B60R 2021/23324* (2013.01)

(58) Field of Classification Search
CPC ................ B60R 21/233; B60R 21/239; B60R 2021/23324; B60R 2021/23169
See application file for complete search history.

(56) References Cited

U.S. PATENT DOCUMENTS

| 6,916,039 | B2 | 7/2005 | Abe | |
|---|---|---|---|---|
| 7,661,700 | B2 * | 2/2010 | Imamura | B60R 21/203 280/730.1 |
| 7,744,117 | B2 * | 6/2010 | Fukawatase | B60R 21/231 280/730.1 |
| 8,696,020 | B2 * | 4/2014 | Tanaka | B60R 21/233 280/728.2 |
| 9,469,270 | B2 * | 10/2016 | Abe | B60R 21/233 |
| 2003/0116945 | A1 * | 6/2003 | Abe | B60R 21/231 280/729 |
| 2003/0193174 | A1 * | 10/2003 | Abe | B60R 21/206 280/730.1 |

(Continued)

FOREIGN PATENT DOCUMENTS

WO WO-2016085168 A1 * 6/2016 ........... B60R 21/233

*Primary Examiner* — James A English
(74) *Attorney, Agent, or Firm* — Stoel Rives LLP

(57) ABSTRACT

Airbag assemblies are disclosed that include inflatable knee airbags. The knee airbags can include panel(s) forming a main chamber that provides a primary cushioning protection zone to a lower leg of a vehicle occupant. The knee airbags can further include an external chamber panel coupled to a rearward surface of an occupant-facing panel, external to the main inflatable chamber, to form an external chamber facing the occupant. Vent(s) through the occupant-facing panel can communicate inflation gas from the main chamber to the external chamber to fill a space between the vehicle and the lower leg of the occupant, and to control timing of inflation of the external chamber to cause it to inflate on lateral sides of the lower leg of the occupant to thereby limit lateral movement of the lower leg relative to the vehicle.

20 Claims, 18 Drawing Sheets

(56) References Cited

U.S. PATENT DOCUMENTS

| | | | | |
|---|---|---|---|---|
| 2011/0175334 A1* | 7/2011 | Miller | ............... | B60R 21/206 |
| | | | | 280/730.2 |
| 2015/0197210 A1* | 7/2015 | Abe | ............... | B60R 21/233 |
| | | | | 280/729 |
| 2016/0052479 A1* | 2/2016 | Komatsu | ............... | B60R 21/231 |
| | | | | 280/730.1 |
| 2016/0068131 A1* | 3/2016 | Komatsu | ............... | B60R 21/233 |
| | | | | 280/730.1 |
| 2017/0313276 A1* | 11/2017 | Yoo | ............... | B60R 21/233 |
| 2019/0061667 A1* | 2/2019 | Abe | ............... | B60R 21/206 |

\* cited by examiner

US 10,457,243 B2

KNEE AIRBAG ASSEMBLIES

TECHNICAL FIELD

The present disclosure relates generally to the field of protection systems for vehicle occupants. More particularly, the present disclosure relates to airbag assemblies, such as inflatable knee airbag assemblies with one or more supplemental external chambers.

BACKGROUND

Protection systems have been installed in vehicles to protect an occupant during a collision event. Some protection systems include inflatable knee airbags. Some protection systems suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1A:
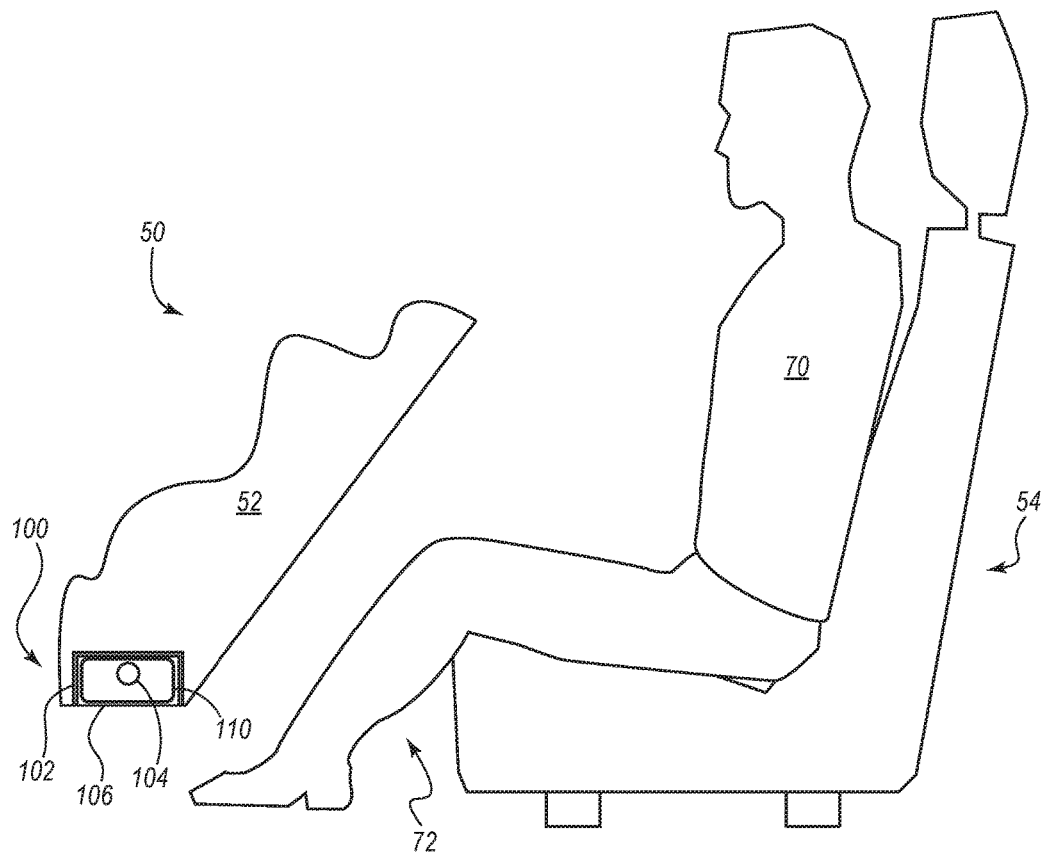
FIG. 1A is a side view of a vehicle seating position within a vehicle with an inflatable knee airbag assembly in a packaged state.

Occupant protection systems, such as airbag assemblies, may be installed at various locations within a vehicle to reduce or minimize occupant injury during a collision event. In the following disclosure, specific reference is made to airbag assemblies that are designed to deploy in the direction of a knee area of an occupant seated in a vehicle seating position, although the principles discussed herein may apply to other types of airbag assemblies that are designed to cushion other portions of an occupant.

Airbag assemblies generally include an airbag cushion. The airbag cushion is typically disposed within a housing in a packaged state (e.g., rolled, folded, and/or otherwise compressed) and may be retained in the packaged state behind a cover. During a collision event, an inflator may be triggered, which rapidly fills the airbag cushion with inflation gas. The inflation gas may cause the airbag cushion to rapidly transition from a compact packaged (i.e., un-deployed) state to an expanded or deployed state. In some embodiments, the expanding airbag cushion opens an airbag cover (e.g., by tearing through a tear seam or opening a door-like structure) to exit the housing. The inflator may be triggered by any suitable device or system, and the triggering may be in response to and/or influenced by one or more vehicle sensors.

Airbag assemblies can also include a knee restraint or knee airbag to protect the knees and/or lower leg of an occupant during a collision event. Such knee restraints may absorb at least some of the impact energy of an occupant during a collision event. In some embodiments, the knee restraint may comprise an airbag cushion that contacts and cushions the knees of an occupant during a collision event.

Some embodiments of airbag assemblies disclosed herein may be useful for protecting occupants seated in a front seat of a vehicle. Other embodiments of the airbag assemblies disclosed herein may be particularly useful for protecting occupants who are seated rearward of the front seats of a vehicle.

For example, in some embodiments, the airbag assemblies include an airbag cushion that is deployed from a position immediately in front of the occupant at a relatively low position. For instance, the airbag cushion may deploy from an instrument panel or a seat back at a position that is level with or lower than the position of the knees of an occupant who is seated in a back seat.

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

An airbag assembly may include internal communication vents to communicate inflation gases into various regions within the airbag assembly, such as from a main chamber to a supplemental chamber. An airbag cushion may also have external exhaust vents to exhaust inflation gases from the airbag cushion to the atmosphere. These vents, either internal communication vents, or external exhaust vents, have a "venting capacity," which may depend on any factor limiting, restricting, or otherwise controlling the rate at which inflation gases pass through the vent(s), or the timing when inflation gases pass through the vent(s), or both timing and rate.

The "venting capacity" of a vent may refer to the degree to which the vent allows inflation gas to pass from or through the vent. Venting capacity may control or otherwise affect the timing for allowing inflation gas to pass through a vent (internally from region to region, or to vent externally). For example, when a vent is configured to allow a substantial volume of inflation gas to pass through or egress in a largely unobstructed fashion, such vent may have a relatively large venting capacity. Conversely, a vent that may more fully obstruct inflation gas from passing through may have a relatively low venting capacity.

The terms "connect" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrase "attached to" refers to interaction between two or more entities that are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

As used herein, the terms "forward" and "rearward" are used with reference to the front and back of the relevant vehicle. For example, an airbag cushion that deploys in a rearward direction deploys toward the back of a vehicle.

The directional terms "proximal" and "distal" are used herein to refer to opposite locations on an airbag cushion. The proximal end of an airbag cushion is the end of the airbag cushion that is closest to the inflator when the airbag cushion is fully inflated. The distal end of an airbag cushion is the end opposite the proximal end of the airbag cushion. In other words, the terms "proximal" and "distal" are with reference to a point of attachment, such as a point of attachment of the airbag cushion at an airbag assembly housing and a point of attachment of an airbag assembly at a seat back from which an airbag deploys. Specifically, "proximal" is situated toward such point of attachment and "distal" is situated away from such point of attachment.

The term "back seat," as used herein, refers to any seat that is disposed rearward of the front seat(s) of a vehicle, regardless of whether the seat is the most rearward seat in the vehicle. The term "back seat" also refers to any seat that is disposed rearward of other back seats.

A "vehicle seating position" may be defined by a seat (e.g., front passenger seat, a front driver seat, a back seat) of a vehicle. A vehicle seating position may be the position in which an occupant is generally positioned when seated in a seat of a vehicle. A vehicle seating position may also be a position in which an occupant may be seated prior to and/or during a collision event or a position in which the vehicle and/or the seat is designed to transport an occupant.

The term "vehicle" may refer to any vehicle, such as a car, truck, bus, airplane, etc.

The term "occupant" generally refers to a person within a vehicle. The term "occupant" can also include a crash test dummy within a vehicle.

FIG. 1A is a partial side view of a vehicle seating position 50 within a vehicle (not shown) having an inflatable knee airbag assembly 100 in a packaged state. An occupant 70 is shown seated in an upright position in an occupant seat 54. An occupant's lower leg 72 is shown. The inflatable knee airbag assembly 100 is configured to deploy from a component of the vehicle (or a vehicle structure 52) at a position below a knee position of the vehicle seating position 50. The vehicle structure 52 may be a portion of an instrumental panel (or dashboard), or, in the case of a back seat, may be another seat forward of the given back seat. The inflatable knee airbag assembly 100 (airbag assembly) includes at least a housing 102, an inflator 104, a covering 106, and an inflatable airbag cushion 110. The housing 102 is mounted in the vehicle, and, more particularly to a lower portion of the vehicle structure 52 immediately forward of the vehicle seating position 50. As shown in FIG. 1A, the inflatable airbag cushion 110 is in a packaged condition within the housing 102 and is configured to receive inflation gas to expand and deploy from the housing 102 to a deployed state. The housing 102 is a component of the airbag assembly 100 which mounts to the vehicle, and which contains (or at least partially houses) and supports the inflator 104 and the airbag cushion 110. The housing 102 may be covered by the covering 106. The inflator 104 may include a container (not shown) for the chemical(s) or system that generates inflation gas, as well as any ducting or plumbing to communicate the inflation gas to the airbag cushion 110, and any other components related to generating and delivering inflation gas to the airbag cushion 110. The inflator 104 may be contained wholly within the housing 102, only partially within the housing 102, or may be wholly external to the housing 102. The covering 106 is a feature of the airbag assembly 100 which may be a component of the housing 102, or may be a component of the vehicle structure 52 to which the housing 102 is mounted. The covering 106 may include a burst seam, tear seam, a panel (which may be hinged at one edge), or by any other suitable means. The airbag cushion 110, in its compressed and packaged state, is contained within the housing 102 behind the covering 106. The airbag cushion 110 is further described below.

The knee airbag assembly 100 may be triggered or activated by one or more sensors (not shown) on any pre-determined event, such as a collision. When the knee airbag assembly 100 is triggered, the inflator 104 is activated to generate and deliver inflation gas to expand and deploy the airbag cushion 110 from the housing 102 to a deployed state. The covering 106 may be triggered to open to permit the airbag cushion 110 to deploy, or the covering 106 may be opened by the expansion of the airbag cushion 110 as it deploys. In other words, in some embodiments, the covering 106 may be equipped with a mechanism that causes the covering to open when triggered, while in other embodiments, the covering 106 may be forced open by the airbag cushion 110 as it begins to expand as a result of inflation gas flowing into the airbag cushion 110 from the inflator 104.

Figure 1B:
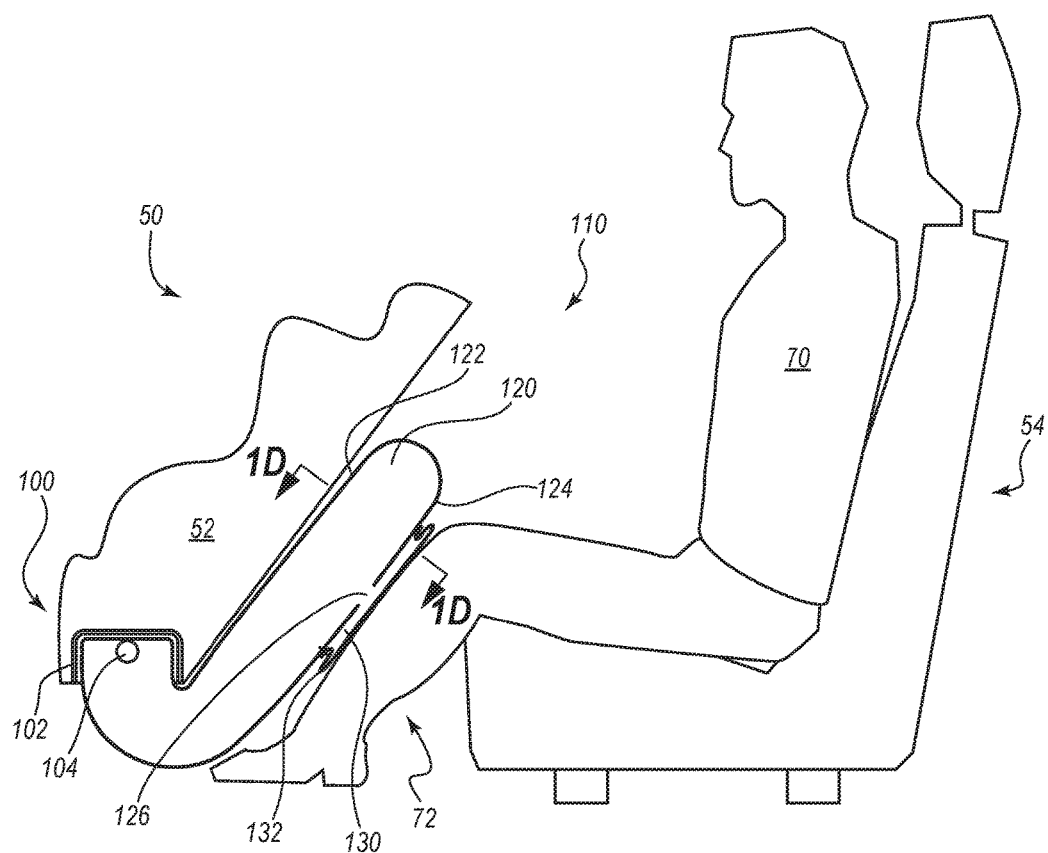
FIG. 1B is a side view of the vehicle seating position with the inflatable knee airbag assembly of FIG. 1A in a deployed state.

FIG. 1B is a side view of the vehicle seating position 50, with the inflatable knee airbag assembly 100 of FIG. 1A in a deployed state. The airbag cushion 110 has at least partially deployed from the housing 102 by action of the inflator 104. The airbag cushion 110 includes a vehicle-facing panel 122 and an occupant-facing panel 124, with the occupant-facing panel 124 coupled to the vehicle-facing panel 122 at a main chamber coupling (not shown, but see, e.g., 123 in FIG. 1D) to form a main inflatable chamber 120 (main chamber). The occupant-facing panel 124 may deploy to be positioned facing the vehicle seating position 50, or, more specifically, facing the occupant seat 54. The vehicle-facing panel 122 may deploy to face opposite the vehicle seating position 50 and in a direction of the vehicle structure 52.

In some embodiments, the occupant-facing panel 124 and the vehicle-facing panel 122 may be separate and distinct panels coupled together at seams to form the main chamber 120. In other embodiments, the occupant-facing panel 124 and vehicle-facing panel 122 may be manufactured of a single, unitary piece of fabric with appropriate cutting, seams, etc., to form the main chamber 120. Seams may be formed by sewing, adhesive, taping, radio-frequency (RF) welding, or any other appropriate means. Seams may be airtight, or may be gas-permeable, depending upon the application of the particular seam. The main chamber coupling (not shown, but see, e.g., 123 in FIG. 1D) may be a seam.

The main chamber 120 of the airbag cushion 110 provides a primary cushioning protection zone to the lower leg(s) 72 of the occupant 70. In other words, the deployed main chamber 120 may be disposed between the occupant seat 54 and the vehicle structure 52 immediately forward of the occupant seat 54 so as to cushion the lower leg(s) 72 from striking the vehicle structure 52, and thereby prevent or reduce injury to the lower leg(s) 72. The airbag cushion 110 also includes a supplemental chamber 130.

The supplemental chamber 130 may be formed by coupling an external chamber panel 132 to an external surface of the occupant-facing panel 124. In FIG. 1B, the external chamber panel 132 couples to the occupant-facing panel 124 at the main chamber coupling (not shown, but see, e.g., 123 in FIG. 1D). In other embodiments, the external chamber panel 132 may couple to the occupant-facing panel 124 elsewhere.

One or more vent(s) 126 in the occupant-facing panel 124 may provide fluid communication between the main chamber 120 and the supplemental chamber 130. The vent(s) 126 may control timing of the communication of inflation gas to the supplemental chamber 130 such that the vent(s) 126 do not introduce inflation gas to the supplemental chamber 130 until the main chamber 120 has filled or substantially filled the space between the lower leg(s) 72 of the occupant 70 and the vehicle structure 52. In other words, in some embodiments the vent(s) 126 may be configured such that the vent(s) 126 do not open or otherwise permit inflation gas to enter the supplemental chamber 130 until a minimum pressure has been achieved in the main chamber 120. The minimum inflation pressure of the main chamber 120 may be reached by the introduction of inflation gas from the inflator 104. The minimum inflation pressure of the main chamber 120 may also be reached by the lower leg(s) 72 engaging the airbag cushion 110 (e.g., before the minimum pressure is otherwise achieved) and applying force on the airbag cushion 110 that raises the internal pressurization of the airbag cushion 110. In other words, if the lower leg(s) 72 impact(s) the airbag cushion 110 before the nominal minimal pressure is achieved in the main chamber 120, the impact of the lower leg(s) 72 may deform the main chamber 120 and cause the pressure within the main chamber 120 to rise such that the vent(s) 126 open or otherwise admit inflation gas to the supplemental chamber 130. In at least some embodiments, the vent(s) 126 may be designed to control timing of the inflation of the supplemental chamber 130 until the lower leg(s) 72 of the occupant 70 begin(s) to engage the airbag cushion 110 such that the supplemental chamber 130 conforms to a forward portion of the lower leg(s) 72 of the occupant 70.

Alternatively or in addition, the vents 126 may have a venting capacity to control or otherwise influence timing of inflation of the supplemental chamber 130 relative to the main chamber. A venting capacity of a given vent 126 may be configured based on a given application for the airbag assembly 100, a distance between a desired main chamber position and the vehicle seating position 50, desired pressurization of the main chamber 120, a size of the main chamber 120, and/or delivery rate of inflation gas from an inflator.

Figure 1C:
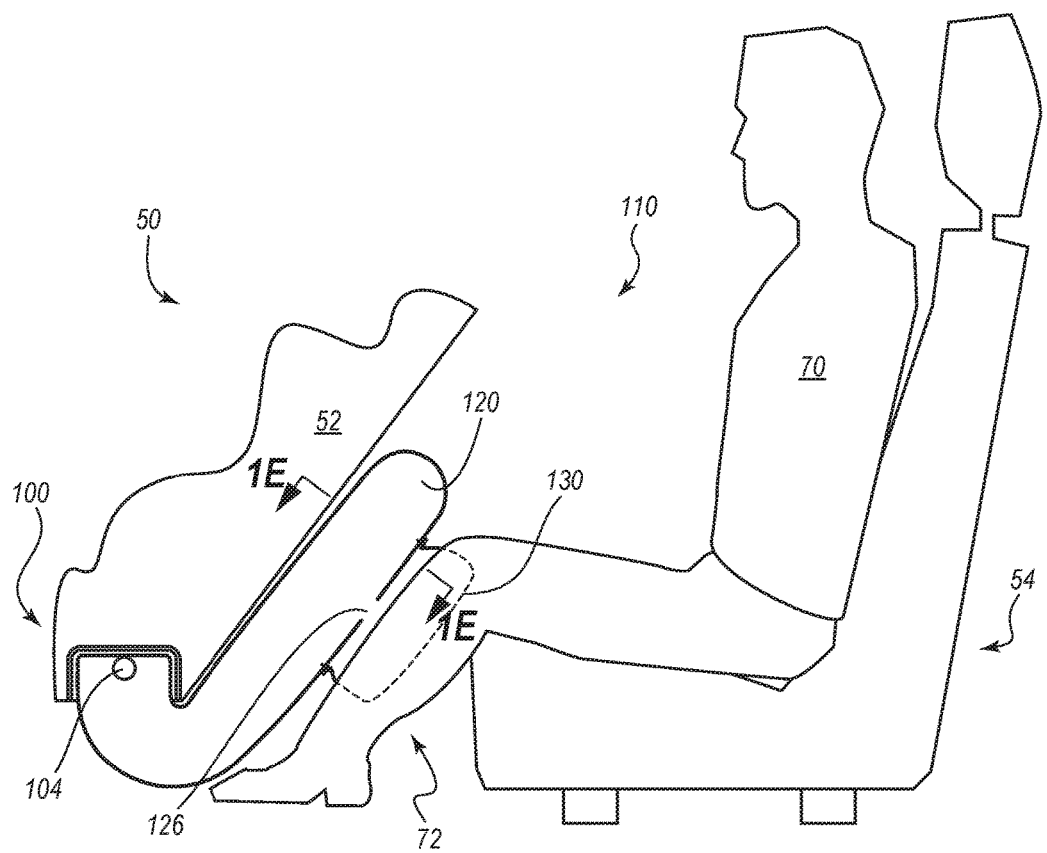
FIG. 1C is a side view of the vehicle seating position with the inflatable knee airbag assembly of FIG. 1A in a deployed state and with the supplemental chamber at least partially inflated.

FIG. 1C is a partial side view of the vehicle seating position 50 with the inflatable knee airbag assembly 100 of FIG. 1A in a deployed state and with the supplemental chamber 130 at least partially inflated. As shown in FIG. 1C, the inflator 104 has continued to provide inflation gas to the main chamber 120. The main chamber 120 has reached an inflation state to cause or permit the vent(s) 126 to communicate inflation gas to the supplemental chamber 130. Alternatively, inflation of the supplemental chamber 130 may have begun due to engagement of the lower leg(s) 72 with the airbag cushion 110, as described elsewhere herein. The supplemental chamber 130 has at least partially inflated. The supplemental chamber 130 may inflate to the lateral sides of the lower leg(s) 72 to limit lateral movement of the lower leg(s) 72 of the occupant 70. If the lower legs 72 are separated from each other when the supplemental chamber 130 inflates, the supplemental chamber 130 may also inflate between the lower legs 72 of the occupant 70. The supplemental chamber 130, by inflating to the lateral sides of, and between the lower legs 72 of the occupant 70, may limit lateral movement of the lower leg(s) 72. Stated differently, the delayed timing of inflation of the supplemental chamber 130 can cause the supplemental chamber 130 to inflate and form around the lower leg(s) 72 of the occupant 70 to stabilize the lower leg(s) 72 against lateral movement. Limiting lateral movement of the lower leg(s) 72 may reduce or eliminate injury to the lower leg(s) 72 (e.g., rolled, sprained, or broken ankles) by preventing the lower leg(s) 72 from striking the vehicle structure 52, or other components of the vehicle (or from the lower legs 72 striking against each other). Limiting lateral movement of the lower legs 72 may be especially beneficial in oblique impact crashes since oblique impact crashes tend to introduce forces that can cause the lower legs 72 to move abruptly laterally.

Figure 1D:
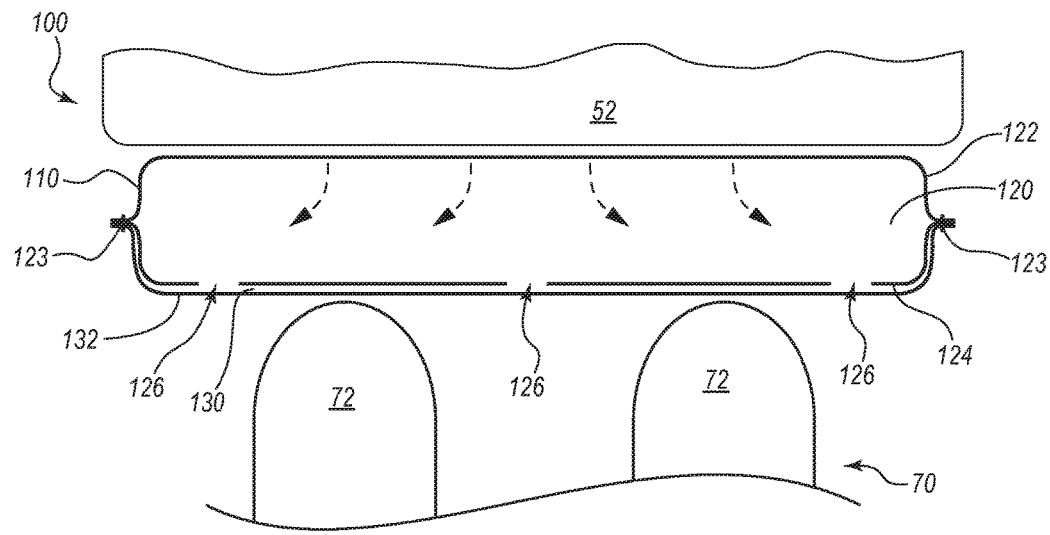
FIG. 1D is an angled top view of the airbag cushion of the airbag assembly of FIG. 1A with the airbag cushion partially deployed.

FIG. 1D is an angled top view of the airbag cushion 110 of the airbag assembly of FIG. 1A with the airbag cushion 110 partially deployed, similar to the state of deployment shown in FIG. 1B. The angle of view for FIG. 1D is shown in FIG. 1B and labeled 1D-1D. The lower legs 72 of the occupant 70 have not yet engaged the airbag cushion 110. The airbag cushion 110 is partially deployed in that the main chamber 120 has at least partially inflated and substantially filled the space between the lower legs 72 of the occupant and the vehicle structure 52 forward of the occupant 70. The supplemental chamber 130 is not yet inflated. The vehicle-facing panel 122 is nearer the vehicle structure 52, while the occupant-facing panel 124 is nearer the lower legs 72. In the embodiment of FIG. 1D, the two panels 122, 124 are coupled at seams forming a main chamber coupling 123. The external chamber panel 132 which forms the supplemental chamber 130 is coupled to the occupant-facing panel 124 of the main chamber 120 at the main chamber coupling 123. The vent(s) 126 may be configured to remain closed or otherwise limit inflation gas from entering the supplemental chamber 130 until a minimum pressure has been achieved in the main chamber 120.

Figure 1E:
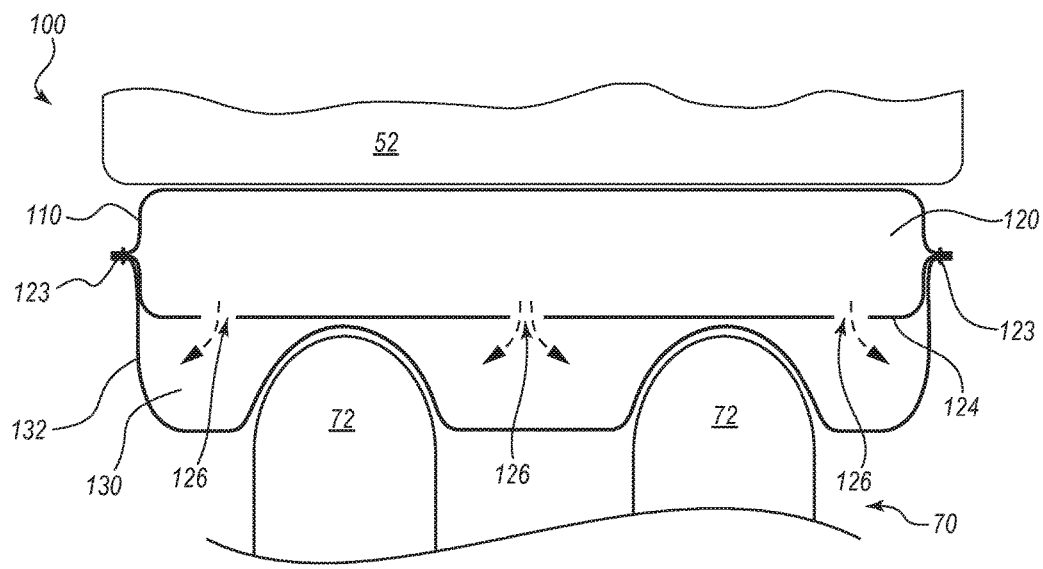
FIG. 1E is a partial angled top view of the airbag cushion of the airbag assembly of FIG. 1A with the airbag cushion at least partially deployed, and the supplemental chamber at least partially inflated.

FIG. 1E is an angled top view of the airbag cushion 110 of the airbag assembly 100 of FIG. 1A with the airbag cushion 110 at least partially deployed, and the supplemental chamber 130 at least partially inflated, similar to the state of deployment shown in FIG. 1C. The angle of view for FIG. 1E is shown in FIG. 1C and labeled 1E-1E. The main chamber 120 of the airbag cushion 110 is at least partially inflated. The supplemental chamber 130 is also at least partially inflated. In FIG. 1E, the supplemental chamber 130 is defined by the external chamber panel 132 coupled to the occupant-facing panel 124 at the main chamber coupling 123. The lower legs 72 and the supplemental chamber 130 are engaged with each other. In some instances, the supplemental chamber 130 may begin inflating as a result of the timing control of the vents 126 permitting inflation gas to enter the supplemental chamber 130 once the nominal minimum inflation pressure of the main chamber 120 has been reached. The vent(s) 126 may control timing of inflation of the supplemental chamber 130. In other instances, the supplemental chamber 130 may begin inflating as a result of the lower legs 72 engaging the airbag cushion 110. The supplemental chamber 130 has at least partially inflated to both lateral sides of, and between, the lower legs 72. In other words, the supplemental chamber 130 has at least partially inflated to conform to the forward portion of the lower legs 72 in order to limit lateral movement of the lower legs 72. The supplemental chamber 130 can stabilize the lower legs 72 against lateral movement so as to prevent or otherwise limit injury to the feet, ankles, and knees (e.g., the lower leg(s) 72) caused by sudden lateral movement of the lower legs 72, such as may occur in an oblique crash condition. Consider that absent stabilization, the lower legs 72 may shift violently in a lateral direction while the feet of the occupant 70 may remain fixed on the floor of the vehicle during an oblique crash condition. The disparity of movement of the feet compared to the upper portion of the lower leg(s) 72 can cause injury. The disclosed embodiments, and specifically the supplemental chamber 130, can limit and/or prevent these kinds of injuries.

In the embodiment of FIG. 1E, three vents 126 are shown. Other configurations are possible to achieve the inflation of the supplemental chamber 130, including the timing controls discussed herein. In some other configurations, there may be a different number of the vents 126. The vents 126 used in any given configuration may all be of the same size and shape, or may vary in size, or in shape, or both. The vents 126 may also vary by placement in the occupant-facing panel 124. Such other configurations of the vents 126 are anticipated by this disclosure.

Figure 2:
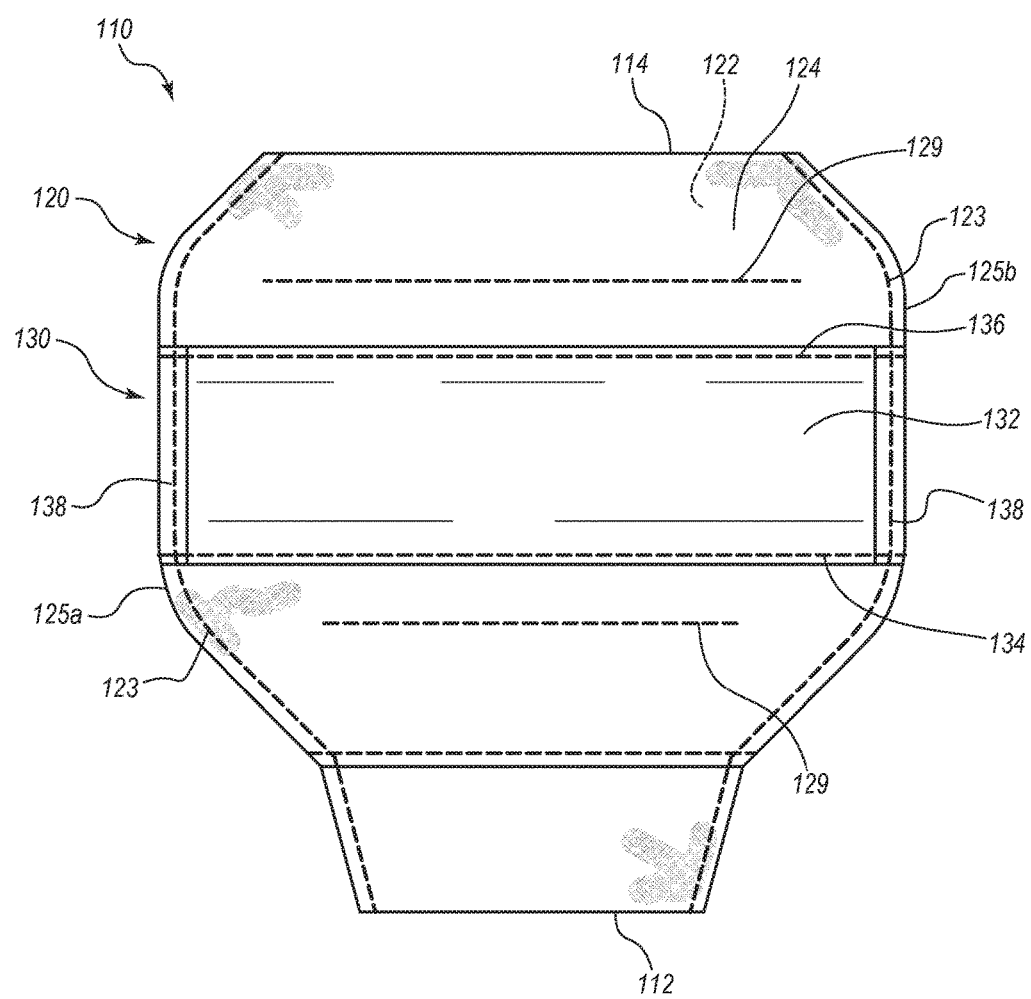
FIG. 2 is a top view of a pre-installation airbag cushion of a knee airbag assembly, according to one embodiment.

FIG. 2 is a top view of the pre-installation airbag cushion 110 of, for example, the knee airbag assembly of FIG. 1A. The airbag cushion 110 is viewed as if it were laid out on a flat surface such as, for example, a tabletop or floor. The occupant-facing panel 124 is shown with the supplemental chamber 130 coupled thereto. The main chamber 120 may include at least one tether coupling 129 near a distal end 114 of the airbag cushion 110, and at least one tether coupling 129 near a proximal end 112 of the airbag cushion 110. (The tethers (internal tethers) are discussed in FIG. 3.) Each tether coupling 129 may be or include a seam of suitable construction. In the embodiment of FIG. 2, the occupant-facing panel 124 and the vehicle-facing panel 122 are formed from a single, unitary piece of suitable fabric with a fold or turn at the distal end 114, and with a first lateral edge 125a and a second lateral edge 125b of the occupant-facing panel 124 and the vehicle-facing panel 122 are coupled at the main chamber couplings 123 to form the inflatable chamber of the main chamber 120. Other suitable configurations forming the main chamber 120 of the airbag cushion 110 are possible and are anticipated by this disclosure (see, e.g., FIG. 3 for another possible configuration).

As shown in FIG. 2, the external chamber panel 132 extends horizontally from the first lateral edge 125a of the occupant-facing panel 124 to the second lateral edge 125b of the occupant-facing panel 124. The external chamber panel 132 is positioned on the occupant-facing panel 124 so as to at least partially overlay or span (or so as to be superimposed on) only the single main inflatable chamber 120 and does not overlay or span multiple main inflatable chambers). The external chamber panel 132 is positioned on the exterior of the occupant-facing panel 124 so as to at least partially overlay a region of the main chamber 120 defined by two adjacent internal tethers (as shown in FIG. 2, co-located at the tether couplings 129). Stated differently, the external chamber panel 132 may extend horizontally from the first lateral edge 125a of the occupant-facing panel 124 to the second lateral edge 125b of the occupant-facing panel 124 and/or may extend vertically along the occupant-facing panel 124 within a perimeter of only the single main inflatable chamber 120 and does not span multiple main inflatable chambers.

The external chamber panel 132 couples to the occupant-facing panel 124 at a proximal coupling 134, a distal coupling 136, and at lateral couplings 138. In the embodiment of FIG. 2, the lateral couplings 138 of the external chamber panel 132 coincide with the main chamber couplings 123 on either side of the occupant-facing panel 124.

In other embodiments, the lateral couplings 138 of the external chamber panel 132 may be located at other suitable positions on the occupant-facing panel 124. The couplings 134, 136, and 138 may each be a seam of suitable construction.

Figure 3:
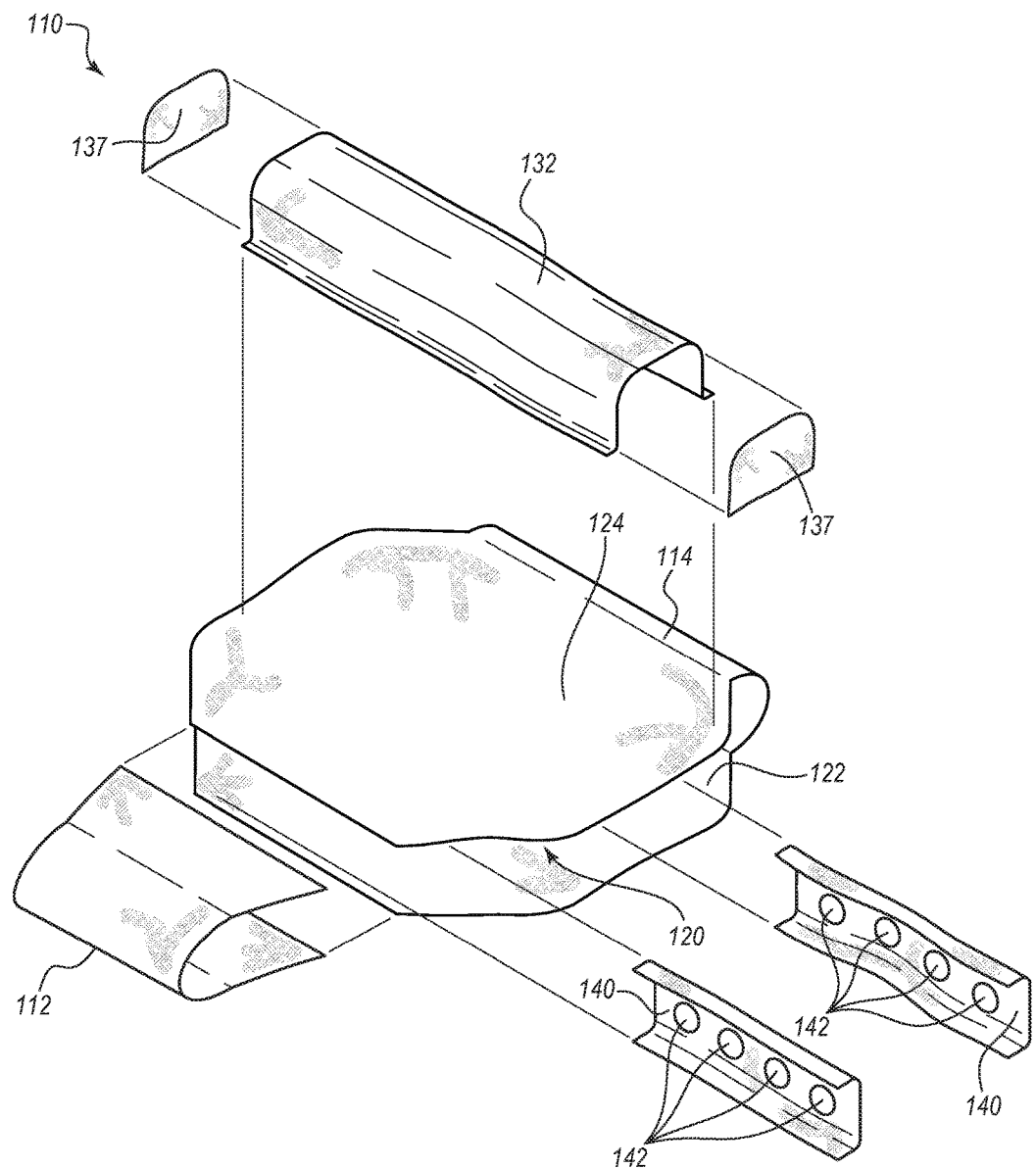
FIG. 3 is a partial exploded orthogonal view of an airbag cushion of a knee airbag assembly, according to one embodiment.

FIG. 3 is a partial exploded orthogonal view of the airbag cushion 110 of FIG. 1A. In the embodiment of FIG. 3, a distal portion of the airbag cushion 110 is formed by a first piece of suitable material with a fold or turn at a proximal end 112 of the airbag cushion and the vehicle-facing panel 122 and the occupant-facing panel 124 are formed from a second piece of suitable material with a fold or turn at the distal end 114 of the airbag cushion 110. The first and second pieces of material are coupled together, such as with stitching. In other embodiments, the vehicle-facing panel and the occupant-facing panel may be formed by single, unitary piece of suitable material with a fold or turn at the proximal end (e.g., see FIG. 5E). In still other embodiments, the vehicle-facing panel and the occupant-facing panel may be formed by single, unitary piece of suitable material with a fold or turn at the distal end.

The external chamber panel 132 is shown having a general shape of a U, as it may when inflated. The external chamber panel 132 is depicted in a simplified view, without the lateral couplings (see, e.g., 138 in FIG. 2). In the embodiment of FIG. 3, each lateral end of the external chamber panel 132 couples with an external panel end cap 137, and the external panel end cap 137 couples at either lateral coupling (not shown, but see, e.g., 138 in FIG. 2). In other embodiments, the lateral ends of the external chamber panel 132 may be formed with appropriate folds, pleats, etc., to accommodate the lateral couplings.

Figure 4A:
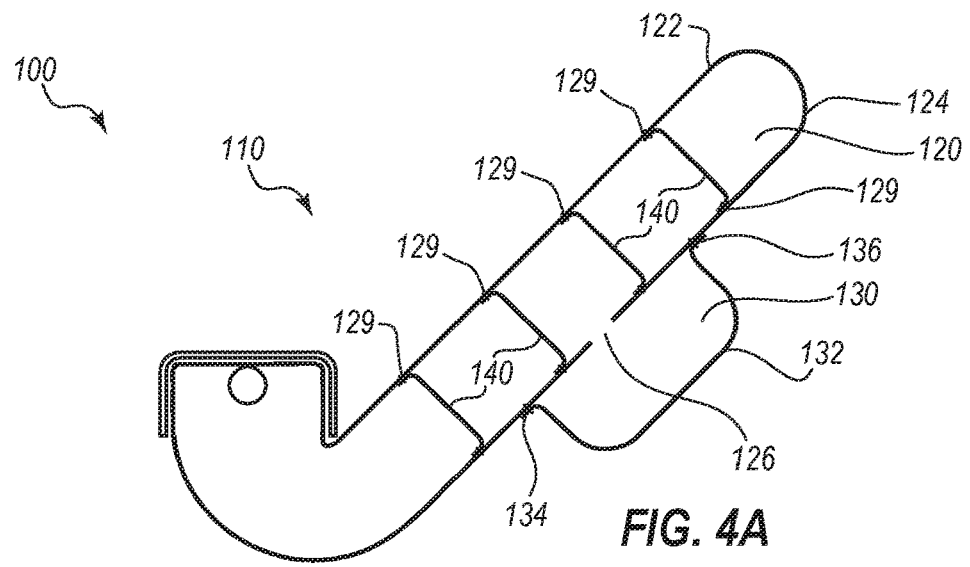
FIG. 4A is a cutaway side view of an airbag assembly, according to one embodiment, with the airbag cushion deployed and at least partially inflated.

FIG. 4A is a cutaway side view of the airbag assembly 100 of FIG. 1A with the airbag cushion 110 deployed and at least partially inflated. In the embodiment of FIG. 4A, the main chamber 120 encloses four internal tethers 140. Each internal tether 140 couples at the tether couplings 129 at an interior surface of both the vehicle-facing panel 122 and the occupant-facing panel 124. Each internal tether 140 may help to shape and define the main chamber 120, and may limit the expansion (generally, front-to-rear relative to the vehicle) of the main chamber 120. For example, the internal tethers 140 may limit a thickness of the main chamber 120.

The main chamber 120 of the airbag cushion 110 may enclose at least one internal tether 140. While in FIG. 3, two internal tethers 140 are depicted, fewer or more internal tethers 140 may be included within the main chamber 120 as appropriate. Each internal tether 140 may include one or more aperture(s) 142 to facilitate fluid communication of inflation gas throughout the main chamber 120 of the airbag cushion 110. The internal tether 140 may be oriented at a right angle to the occupant-facing panel 124, as illustrated. In other embodiments, the internal tether 140 may be oriented at any suitable angle relative to the occupant-facing panel 124 and the vehicle-facing panel 122. Each internal tether 140 couples at the interior surface of both the occupant-facing panel 124 and the vehicle-facing panel 122 at tether couplings (not shown, but see, e.g., 129 in FIG. 2). For illustration purposes, the main chamber 120 of the airbag cushion 110 is depicted with straight lines such that the occupant-facing panel 124 and the vehicle-facing panel 122 are parallel and provide uniform surfaces. See, e.g., FIGS. 1B, 1C, 4A, 4B, and 4C. As can be appreciated, a pressurized cushion may result in bulging of the panels 124, 122 between the internal tethers 140, presenting a curved, dimpled, or otherwise non-uniform surface.

The external chamber panel 132 couples to an exterior surface of the occupant-facing panel 124 at or near the first and second lateral edges (not shown, but see, e.g., 125a and 125b in FIG. 2) of the main chamber 120, and at the proximal coupling 134 and the distal coupling 136. The external chamber panel 132 at least partially defines the supplemental chamber 130. In the embodiment of FIG. 4A, the supplemental chamber 130 extends vertically along the exterior surface of the occupant-facing panel 124 and within a perimeter of the occupant-facing panel 124. In other words, in the embodiment of FIG. 4A, the supplemental chamber 130 may overlay two of the internal tethers 140. In an embodiment with more than four internal tethers 140, the supplemental chamber 130 may overlay more than two internal tethers 140. Said otherwise, in an embodiment with four or more internal tethers 140, the supplemental chamber 130 may overlay all of the internal tethers 140 except the most distal and most proximal internal tether 140.

The occupant-facing panel 124 includes at least one vent 126 to facilitate fluid communication of inflation gas to the supplemental chamber 130. In an embodiment wherein the supplemental chamber 130 overlays multiple internal tethers 140, there may be multiple vents 126 in the occupant-facing panel 124.

Figure 4B:
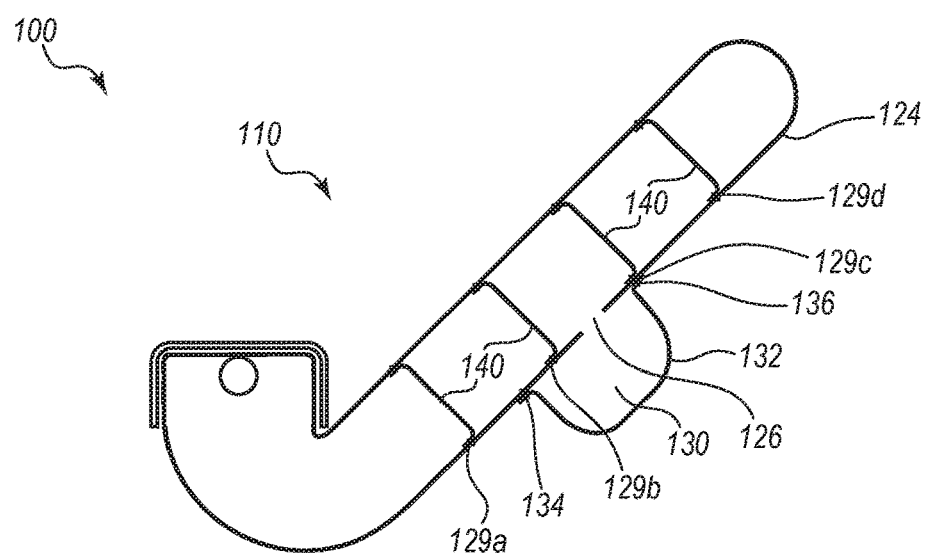
FIG. 4B is a cutaway side view of an airbag assembly, according to one embodiment, with the airbag cushion deployed and at least partially inflated and depicting another embodiment of a supplemental chamber.

FIG. 4B is a cutaway side view of the airbag assembly 100 of FIG. 1A, according to another embodiment, with the airbag cushion 110 deployed and at least partially inflated and depicting another embodiment of the supplemental chamber 130. In the embodiment of FIG. 4B, the distal coupling 136 of the external chamber panel 132 may be co-located with the tether coupling 129c such that the supplemental chamber 130 extends vertically within a perimeter of an internal section of the main chamber 120. In FIG. 4B, the distal coupling 136 is co-located with a tether coupling 129c, and the proximal coupling 134 is located between a proximally adjacent tether coupling 129a and a next proximally adjacent tether coupling 129b. In another embodiment, the proximal coupling 134 may be co-located with the tether coupling 129 with the distal coupling 136 located between the distally adjacent tether couplings 129. In either of the embodiments of FIG. 4B, the vent(s) 126 may be positioned in the enclosed region of the occupant-facing panel 124 to best afford fluid communication of inflation gas from the main chamber 120 to the supplemental chamber 130.

Figure 4C:
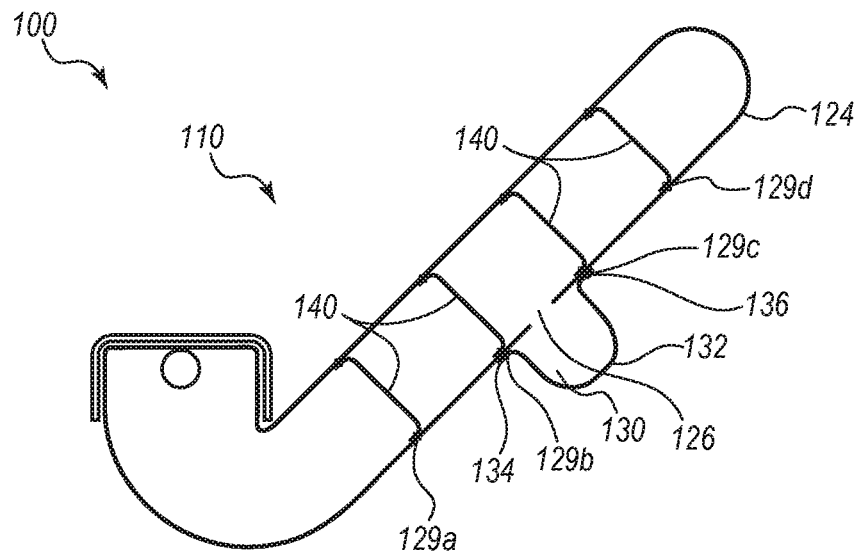
FIG. 4C is a cutaway side view of the airbag assembly, according to one embodiment, with the airbag cushion deployed and at least partially inflated and depicting yet another embodiment of a supplemental chamber.

FIG. 4C is a cutaway side view of the airbag assembly 100 of FIG. 1A, according to yet another embodiment, with the airbag cushion 110 deployed and at least partially inflated and depicting another embodiment of the supplemental chamber 130. In the embodiment of FIG. 4C, the supplemental chamber 130 extends vertically, or overlays, along the occupant-facing panel 124 and within a perimeter of the occupant-facing panel 124. In the illustrated embodiment of FIG. 4C, the supplemental chamber 130 is also within a perimeter formed by the adjacent internal tethers 140. The proximal coupling 134 may be co-located with or near the tether coupling 129b. The distal coupling 136 may be co-located with or near the tether coupling 129c. The vent(s) 126 may be located in that portion of the occupant-facing panel 124 overlain by the supplemental chamber 130.

Figure 4D:
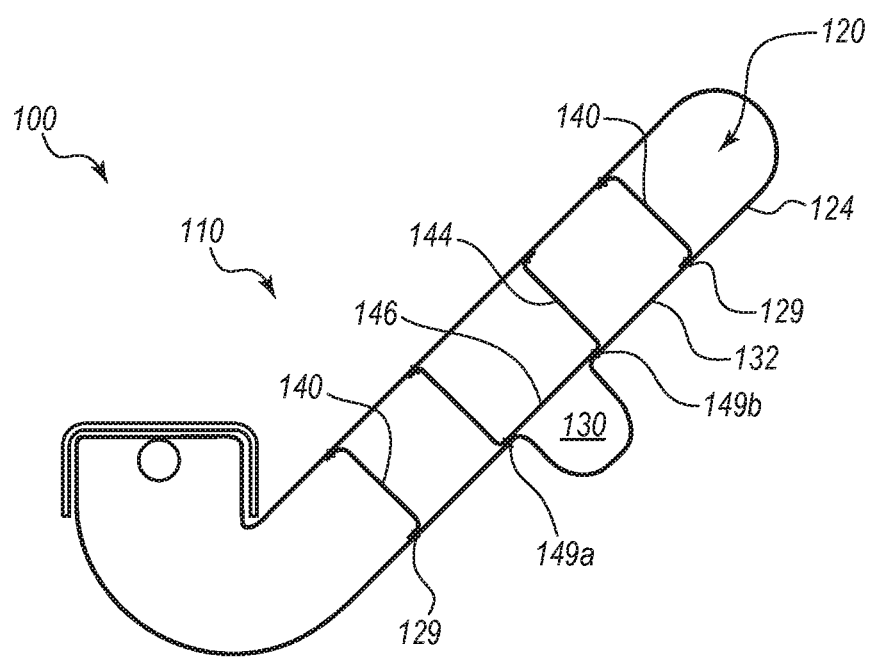
FIG. 4D is a cutaway side view of the airbag assembly, according to one embodiment, with the airbag cushion deployed and at least partially inflated and depicting another embodiment of a supplemental chamber.

FIG. 4D is a cutaway side view of the airbag assembly 100 of FIG. 1A, according to yet another embodiment, with the airbag cushion 110 deployed and at least partially inflated, and depicting another embodiment of a supplemental chamber 130. In the embodiment of FIG. 4D, the external chamber panel (see 132 in FIG. 4C) is omitted and the supplemental chamber 130 may be formed by a configuration of the occupant-facing panel 124 achieved with a bridging internal tether 144 internal to the main chamber 120. The bridging internal tether 144 may comprise an internal panel (the bridging internal tether 144) which may be coupled to an internal surface of the occupant-facing panel 124 at a first position (a bridge segment coupling 149a), and at a second position (a bridge segment coupling 149b) vertically displaced from the first position. The bridging internal tether 144, and more specifically a bridge segment 146, may configure a portion of the occupant-facing panel 124 to form a generally U-shaped channel comprising the supplemental chamber 130. In other words, the bridging internal tether 144 may include the bridge segment 146. The bridge segment 146 may couple to an internal surface of the occupant-facing panel 124 at the proximal bridge segment coupling 149a, and at the distal bridge segment coupling 149b. The bridge segment 146 is shorter vertically than is the corresponding region of the occupant-facing panel 124 defined by the bridge segment couplings 149a and 149b. The bridge segment 146 of the bridging internal tether 144 may include vent(s) (not shown, but see, e.g., 126 in FIG. 4C) to permit fluid communication of inflation gas from the main chamber 120 to the supplemental chamber 130. The supplemental chamber 130 is configured to extend rearward toward the vehicle seating position (not shown, but see, e.g., 50 in FIG. 1C) farther than the adjacent portions of the occupant-facing panel 124.

The vent(s) of the bridge segment 146 may be configured to control the timing of the communication of inflation gas to the supplement chamber 130 similarly to the vent(s) of other embodiments (see, e.g., 126 in FIG. 1E) to cause the supplemental chamber 130 to inflate on lateral sides of the lower leg of the occupant to limit lateral movement of the lower leg relative to the vehicle. The vent(s) control timing of inflation of the supplemental chamber 130.

FIGS. 5A-5E depict an embodiment of an airbag assembly 500 that resembles the airbag assembly 100 described above in certain respects. Accordingly, like features are designated with like reference numerals, with the leading digits incremented to "5." For example, the embodiment depicted in FIG. 5A includes an airbag cushion 510 that may, in some respects, resemble the airbag cushion 110 described above. Relevant disclosure set forth above regarding similarly identified features thus may not be repeated hereafter. Moreover, specific features of the airbag assembly 100 and related components shown in FIGS. 1A-4C may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly and related components depicted in FIG. 5A, et seq. Any suitable combination of the features, and variations of the same, described with respect to the airbag assembly 100 and related components illustrated in FIGS. 1A-4C can be employed with the airbag assembly 500 and related components of FIG. 5A, and vice versa. This pattern of disclosure applies equally to further embodiments depicted in subsequent figures and described hereafter, wherein the leading digits may be further incremented.

Figure 5A:
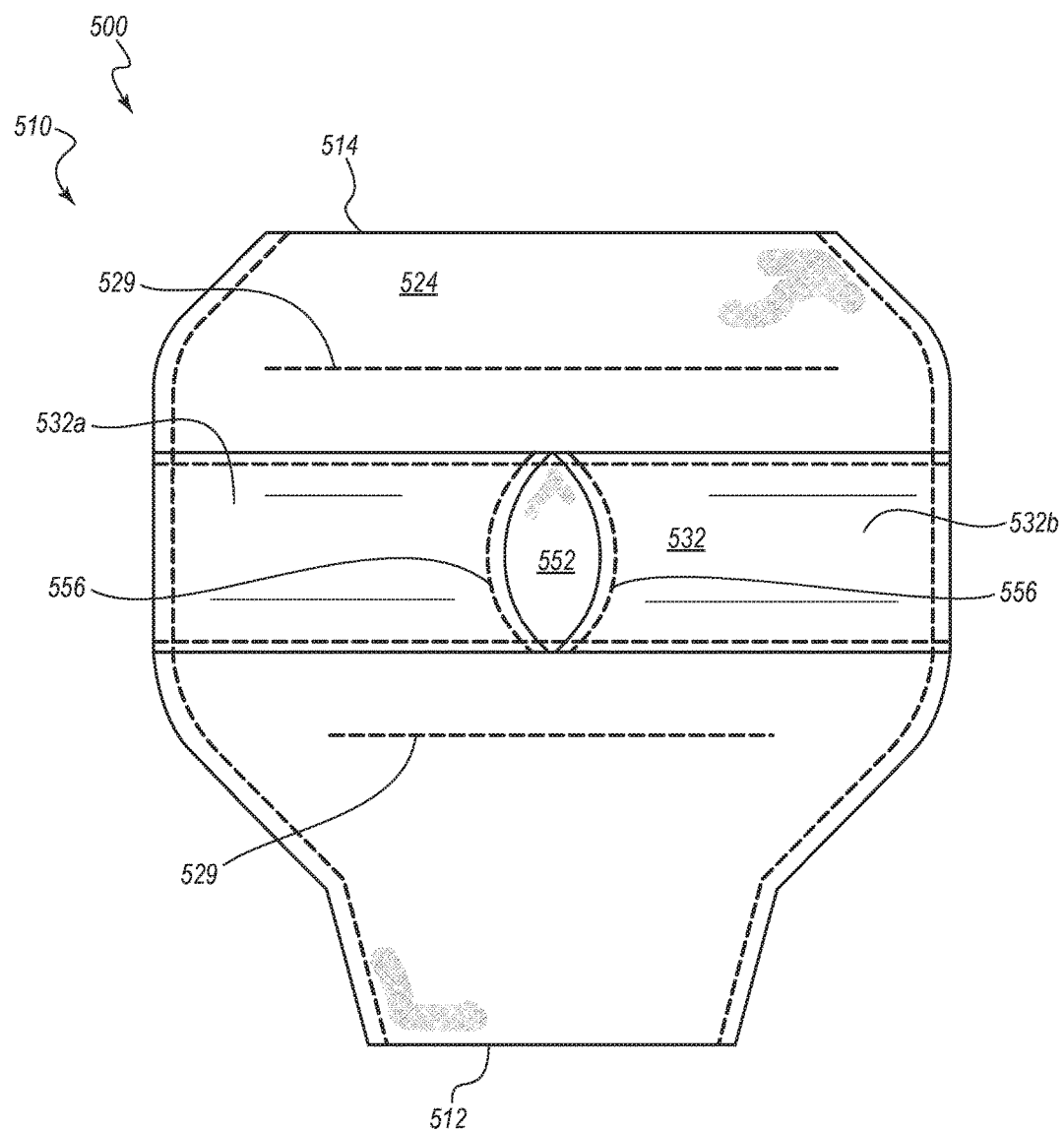
FIG. 5A is a top view of an airbag cushion of an airbag assembly, according to another embodiment.

FIG. 5A is a top view of an airbag cushion 510 of an airbag assembly 500, according to another embodiment. The airbag cushion 510 is viewed as if it were laid out on a flat surface such as, for example, a tabletop or floor. The airbag cushion 510 includes an occupant-facing panel 524 and an external chamber panel 532. The occupant-facing panel 524 at least partially forms a main inflatable chamber and the external chamber panel 532 forms an external inflatable chamber (or supplemental chamber) that protrudes or otherwise extends rearward from a rearward surface of the occupant-facing panel 524 of the main inflatable chamber toward the occupant. Also shown in FIG. 5A are an airbag cushion proximal end 512, an airbag cushion distal end 514, and a plurality of tether couplings 529. The external chamber panel 532 includes a bubble panel 552 configured to expand to form a rearward protrusion in a rear surface of the supplemental chamber (see 530 in FIG. 5B) upon inflation of the supplemental chamber in a deployed state.

In the embodiment of FIG. 5A, the external chamber panel 532 includes a plurality of discrete sections attached together, including an external chamber first lateral panel 532a, an external chamber second lateral panel 532b, and the external chamber center bubble panel 552. The external chamber center bubble panel 552 may have the shape of a vertical cross-section of a prolate spheroid, or, in other words, the general two-dimensional shape of an almond or football (American style). As used in this disclosure, "almond" refers to vesica piscis. The major axis of the external chamber center bubble panel 552 may be aligned with and at or near a center of the airbag cushion 510. In other words, the major axis of the prolate spheroid shape of the external chamber center bubble panel 552 is disposed at or near the lateral center of the airbag cushion 510. Expressed yet another way, the external chamber center bubble panel 552 is approximately equidistant from lateral edges of the airbag cushion 510. The external chamber center bubble panel 552 may couple to the external chamber first lateral panel 532a and the external chamber second lateral panel 532b at a plurality of external chamber bubble panel couplings 556. The external chamber bubble panel couplings 556 may each be a seam formed by stitching, ultrasonic welding, or any suitable method.

The external chamber first lateral panel 532a and the external chamber second lateral panel 532b may each be a rectangle-shaped section having a first side with a length similar to a length of a perimeter of a corresponding first side of the external chamber center bubble panel 552. The first side of the rectangle-shaped section is attached to the external chamber center bubble panel 552 along a first side of the almond shape of the external chamber center bubble panel 552. The almond-shaped external chamber center bubble panel 552 is disposed between and attached to two opposing lateral sections, namely the external chamber first lateral panel 532a and the external chamber second lateral panel 532b, of the plurality of sections of the external chamber panel 532. The two lateral sections, namely the external chamber first lateral panel 532a and the external chamber second lateral panel 532b, each include a first side with a length similar to a length of a perimeter of a corresponding side of the almond-shaped external chamber center bubble panel 552. The first side of each of the lateral panels 532a, 532b is attached along the perimeter of the corresponding side of the almond-shaped external chamber center bubble panel 552.

Figure 5B:
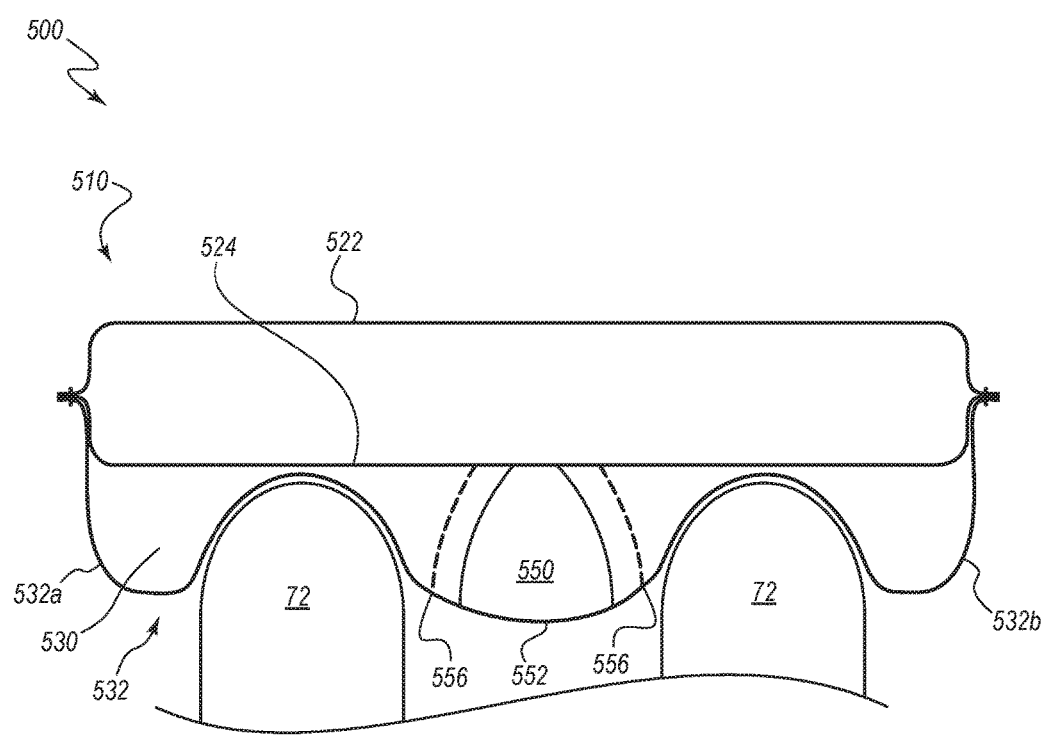
FIG. 5B is an angled top view of the airbag cushion of FIG. 5A with the airbag cushion at least partially deployed, and the supplemental chamber and a center bubble at least partially inflated.

FIG. 5B is an angled top view of the airbag cushion 510 of FIG. 5A with the airbag cushion 510 at least partially deployed, and the supplemental chamber 530 (including the center bubble 550) at least partially inflated. The angle of view for FIG. 5B is the same as or closely similar to that for FIG. 1E. The vehicle-facing panel 522 is shown for reference. The external chamber panel 532 includes a plurality of panels 532a, 532b, 552 attached together such that at least one section (e.g., the external chamber center bubble panel 552) of the plurality of sections is configured to extend rearward farther than an adjacent portion of another panel 532a, 532b of the plurality of sections. In other words, the supplemental chamber 530 is formed of the external chamber first lateral panel 532a, the external chamber second lateral panel 532a, and the external chamber center bubble panel 552. The external chamber center bubble panel 552 is coupled to each external chamber lateral panel 532a and 532b at the external chamber bubble panel couplings 556. The center bubble 550 may extend rearward farther than the external chamber first lateral panel 532a or the external chamber second lateral panel 532b. More simply stated, the supplemental chamber center bubble 550 may extend farther rearward than do adjacent portions of the supplemental chamber 530. The farther rearward extension of the center bubble 550 may assist in eliminating or reducing lateral movement of the lower legs 72 of an occupant during a collision event, including lateral movement producing impact of the lower legs 72 against each other or unduly rotating the ankles, thereby reducing or preventing injury to the occupant, including the type of lower leg injuries frequently associated with oblique impact collision events.

Figure 5C:
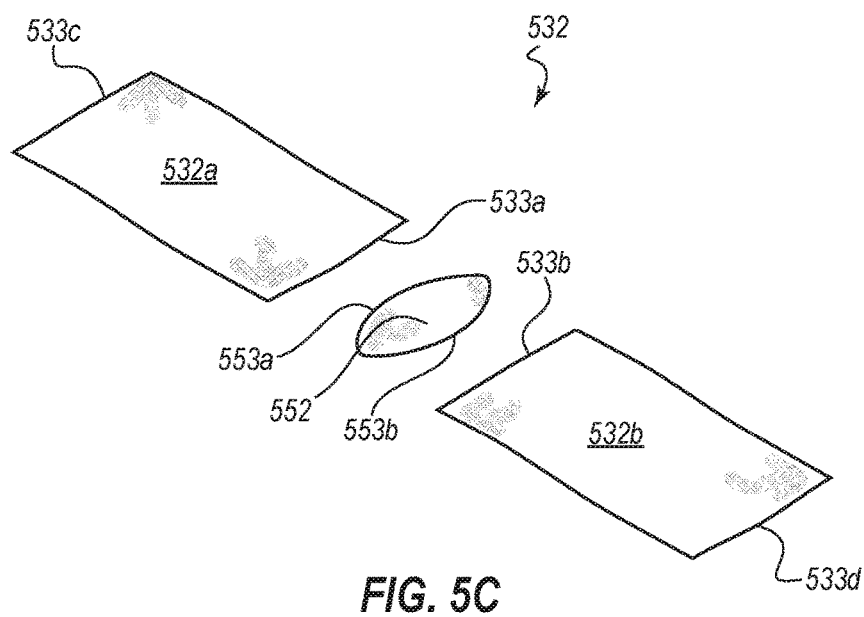
FIG. 5C is a partial exploded orthogonal view of the external chamber panel of the airbag assembly of FIG. 5A.

FIG. 5C is a partial exploded orthogonal view of the external chamber panel 532 of the airbag assembly 500 of FIGS. 5A and 5B. The external chamber panel 532 includes the first lateral panel 532a, the second lateral panel 532b, and the external chamber bubble panel 552. The external chamber bubble panel 552 has a prolate spheroid, or almond, shape. The almond-shaped external chamber bubble panel 552 is disposed between and attached to two opposing lateral panels 532a, 532b of the plurality of sections forming the external chamber panel 532.

Figure 5D:
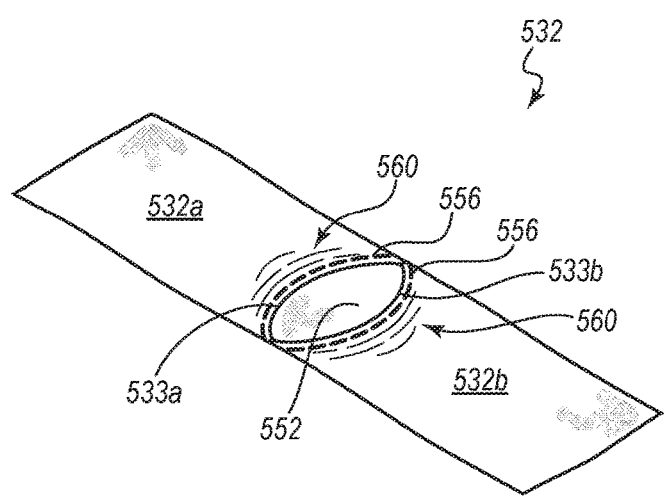
FIG. 5D is an orthogonal view of the assembled, pre-installed external chamber panel of the airbag cushion of FIG. 5A.

The external chamber center bubble panel 552 couples to each lateral panel 532a, 532b at the external chamber center bubble panel coupling (not shown, but see, e.g., 556 in FIGS. 5A and 5D). The first lateral panel 532a may be a rectangle-shaped section having a first side, or a medial edge 533a, with a length similar to the length of the perimeter of a corresponding side, or a first lateral edge 553a of the almond-shaped external chamber center bubble panel 552. The medial edge 533a is configured to couple to the first lateral edge 553a of the external chamber center bubble panel 552. Similarly, the second lateral panel 532b generally mirrors the first lateral panel 532a. In other words, the second lateral panel 532b is also rectangle-shaped, having a medial edge 533b with a length similar to the perimeter of a second lateral edge 553b of the external chamber center bubble panel 552; and the medial edge 533b is configured to couple to the second lateral edge 553b of the external chamber center bubble panel 552. The first lateral panel 532a also includes a lateral edge 533c. The second lateral panel 532b also includes a lateral edge 533d.

FIG. 5D is an orthogonal view of the assembled, pre-installed external chamber panel 532 of the airbag assembly 500 of FIGS. 5A through 5C. The external chamber center bubble panel 552 is disposed between the two lateral panels 532a and 532b. The external chamber center bubble panel 552 is coupled to the two lateral panels 532a and 532b at the bubble panel couplings 556. The almond shape of the external chamber center bubble panel 552 permits or causes a plurality of pleats or folds 560 to form near the medial edges 533a, 533b, of either lateral panel 532a, 532b. The pleats or folds 560 cause or permit the external chamber center bubble panel 552 to extend rearward farther than other sections of the external chamber panel 532 to form the center bubble (not shown, but see, e.g., 550 in FIG. 5B).

Figure 5E:
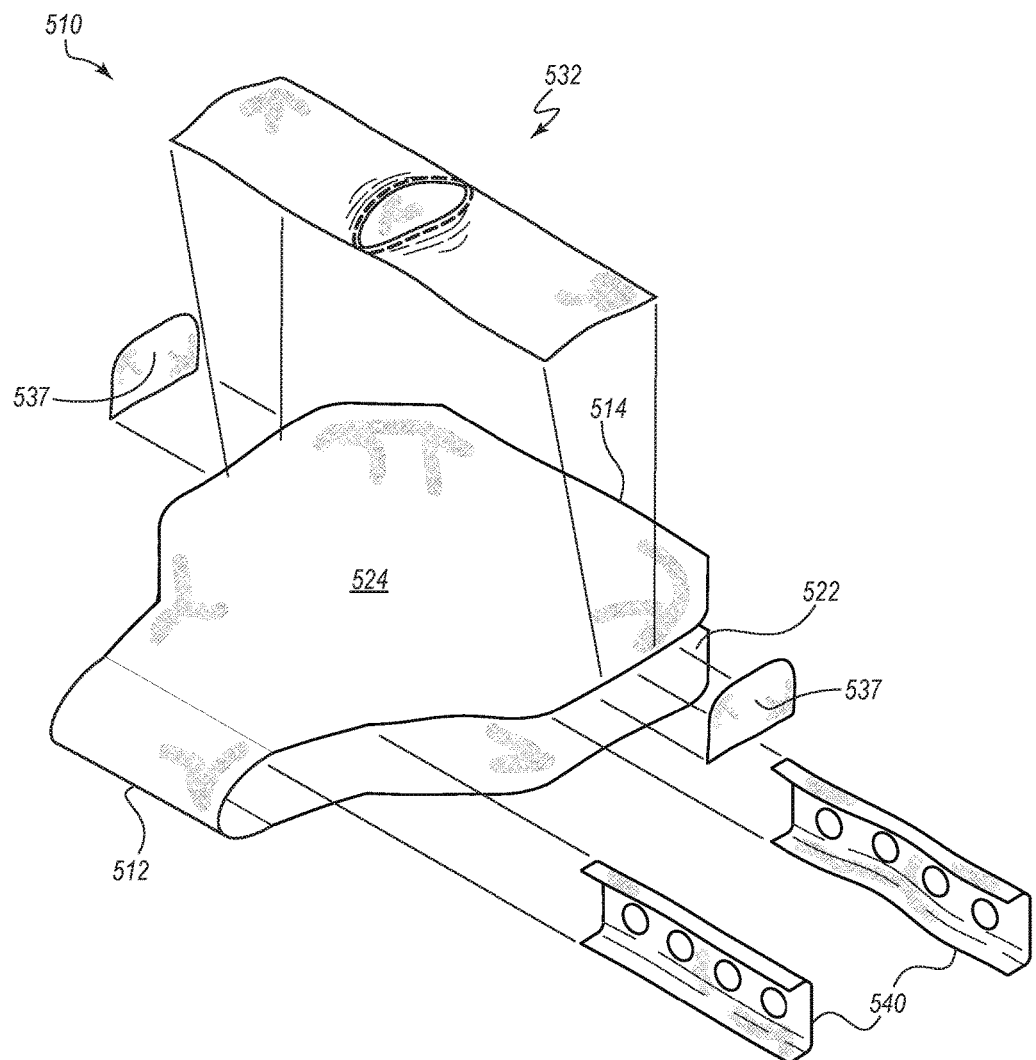
FIG. 5E is a partial exploded orthogonal view of the airbag cushion of FIG. 5A with the assembled external chamber panel.

FIG. 5E is a partial exploded orthogonal view of the airbag cushion 510 of FIGS. 5A through 5D with the assembled external chamber panel 532. The vehicle-facing panel 522 and the occupant-facing panel 524 are shown for reference, as are the airbag cushion proximal end 512 and the airbag cushion distal end 514. In the embodiment of FIG. 5E, the assembled external chamber panel 532 couples an external chamber panel end cap 537 at each lateral end of the external chamber panel 532. In the embodiment of FIG. 5E, the external chamber panel end caps 537 couple to either lateral end of the external chamber panel 532 and to the lateral coupling (not shown, but see, e.g., 138 in FIG. 2). Two internal tethers 540 are shown for reference.

Figure 6A:
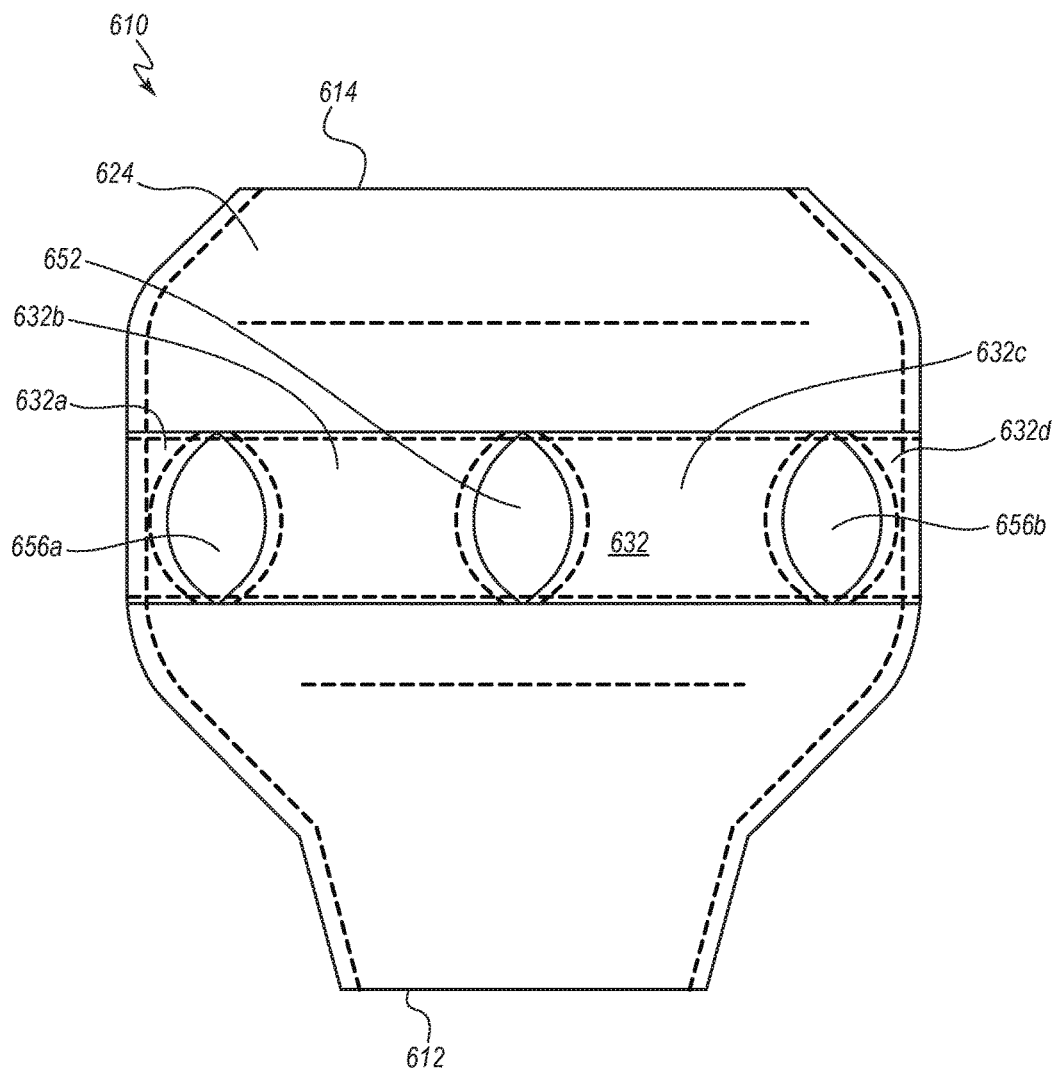
FIG. 6A is a top view of a pre-installation airbag cushion, according to another embodiment, and including a plurality of bubble panels.

FIG. 6A is a top view of an airbag cushion 610, according to another embodiment, and including a plurality of bubble panels 652, 656a, 656b. The airbag cushion 610 is viewed as if it were laid out on a flat surface such as, for example, a tabletop or floor. The airbag cushion proximal end 612 is shown toward the bottom of the drawing of FIG. 6A, and the airbag cushion distal end 614 is shown toward the top of the drawing of FIG. 6A. In the embodiment of FIG. 6A, the plurality of sections of the external chamber panel 632 includes the almond-shaped sections, or the bubble panels 652, 656a, 656b. A central bubble panel 652 is located at or near the lateral center of the external chamber panel 632. A lateral bubble panel 656a, 656b is located near either lateral end of the external chamber panel 632.

A first external chamber distolateral panel 632a is located laterally outboard of the first lateral bubble panel 656a. A first external chamber mediolateral panel 632b is located between the first lateral bubble panel 656a and the center bubble panel 652. A second external chamber mediolateral panel 632c is located between the center bubble panel 652 and the second lateral bubble panel 656b. A second external chamber distolateral panel 632d is located laterally outboard of the second lateral bubble panel 656b. Each bubble panel 652, 656a, 656b couples to the corresponding edges of the relevant external chamber sub-panels 632a, 632b, 632c, 632d in a fashion similar to that described above with reference to FIGS. 5A through 5D.

Figure 6B:
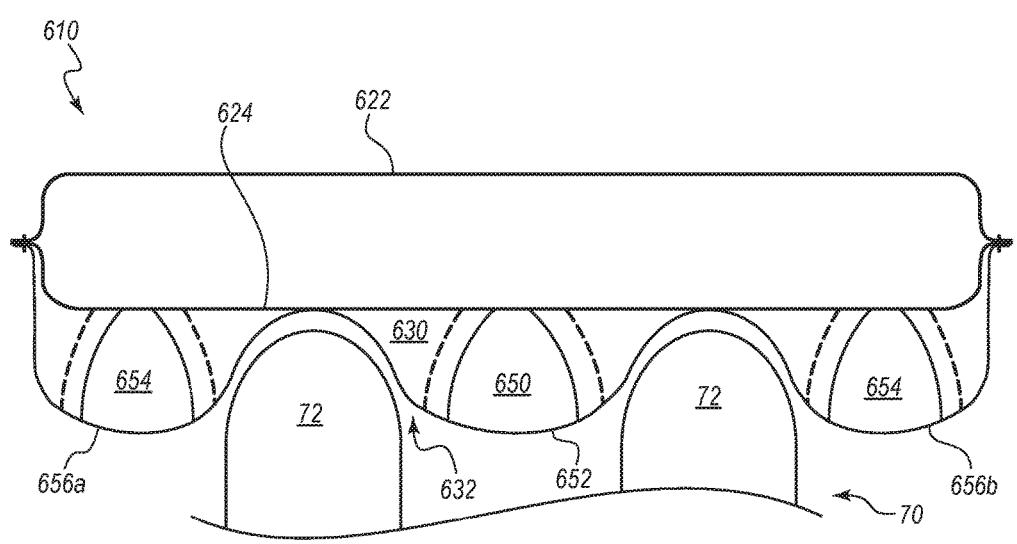
FIG. 6B is an angled top view of the airbag cushion of FIG. 6A with the airbag cushion at least partially deployed, and the supplemental chamber and a plurality of cushion bubbles at least partially inflated.

FIG. 6B is an angled top view of the airbag cushion 610 of FIG. 6A with the airbag cushion 610 at least partially deployed, and the supplemental chamber 630 and a plurality of cushion bubbles 650, 654 at least partially inflated. The angle of view for FIG. 6B is the same as or similar to that for FIG. 1E. The vehicle-facing panel 622 and the occupant-facing panel 624 are shown for reference. The supplemental chamber 630 includes a center bubble 650 and two lateral bubbles 654. The bubbles 650, 654 are formed by the center bubble panel 652 and the lateral bubble panels 656a, 656b. The bubbles 650, 654 may be positioned and configured to prevent or reduce lateral movement of the lower legs 72 (or knees) of the occupant 70 during a collision event, in particular, in an oblique-impact collision event, thereby reducing or preventing injury to the lower legs 72. In other words, the center bubble 650 may prevent or limit the impact of the lower legs 72 against each other, and the lateral bubbles 654 may prevent or limit impact of the lower legs 72 with various vehicle components, such that injury to the lower legs 72 of the occupant 70 may be reduced or prevented.

Figure 7A:
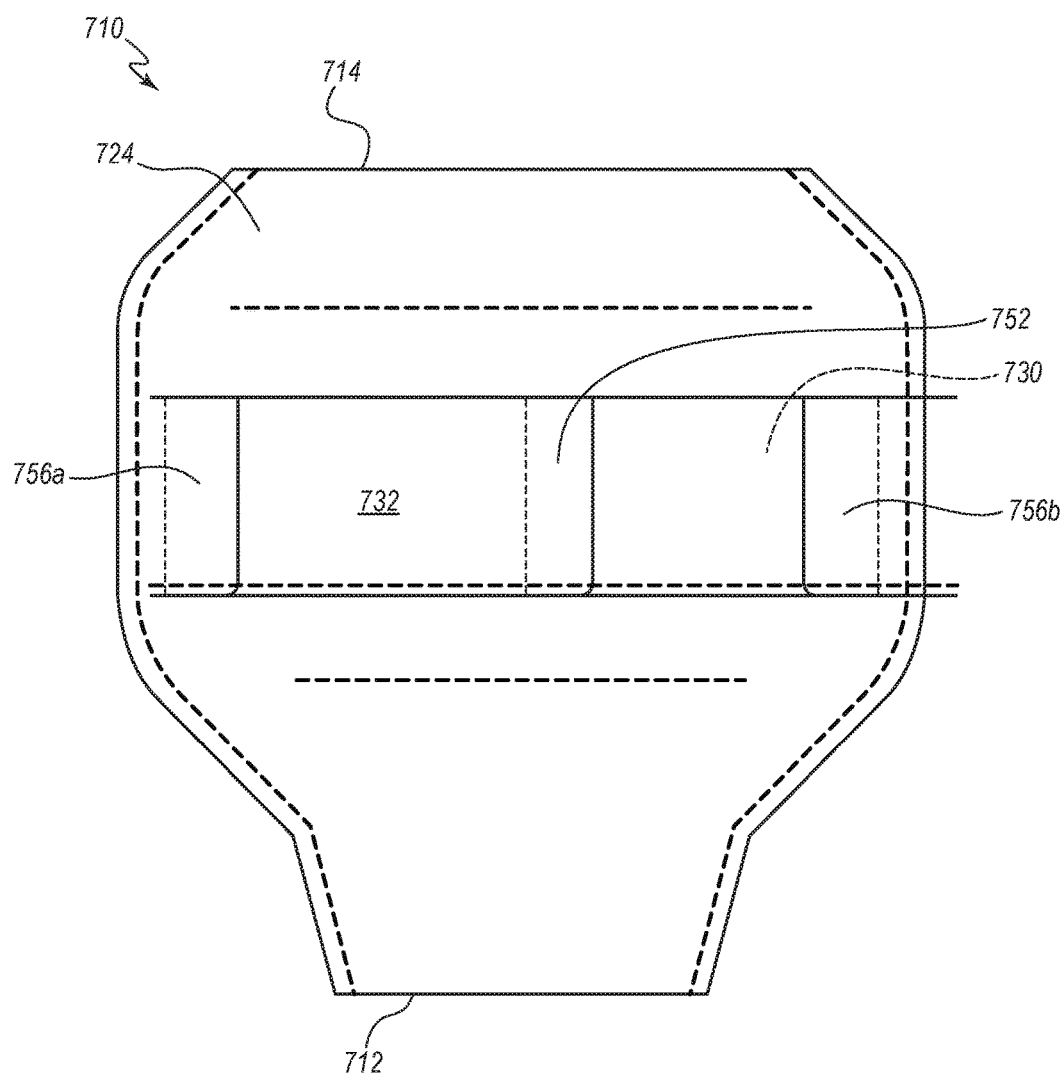
FIG. 7A is a top view of a pre-installation airbag cushion of an airbag assembly, according to another embodiment, and including a plurality of pleat bubbles.

FIG. 7A is a top view of a pre-installation airbag cushion 710 of an airbag assembly, according to another embodiment, and including a plurality of pleat fold 752, 756a, 756b that form pleat bubbles when expanded. The airbag cushion 710 is viewed as if it were laid out on a flat surface such as, for example, a tabletop or floor with an occupant-facing panel 724 facing up. A proximal end 712 of the airbag cushion 710 is shown near the bottom of the drawing of FIG. 7A, and a distal end 714 of the airbag cushion 710 is near the top of the drawing of FIG. 7A. In the embodiment of FIG. 7A, a pleat fold 752 of the material of an external chamber panel 732 is located near a lateral center of the external chamber panel 732. Also in FIG. 7A, a lateral pleat fold 756a, 756b is located near either lateral end of the external chamber panel 732. In the embodiment of FIG. 7A, each of the pleat folds 752, 756a, 756b may be formed as a lateral extension of the material forming the external chamber panel 732. In other words, the fabric panel which forms the external chamber panel 732 may be laterally wider than the width of the deployed, inflated airbag cushion 710 sufficient to permit folding and pleating each of the pleat folds 752, 756a, 756b. Each pleat fold 752, 756a, 756b may be formed by appropriately folding the fabric panel which forms the external chamber panel 732 such that the pleat folds 752, 756a, 756b may expand rearward (relative to the vehicle) during inflation of the supplemental chamber 730.

Figure 7B:
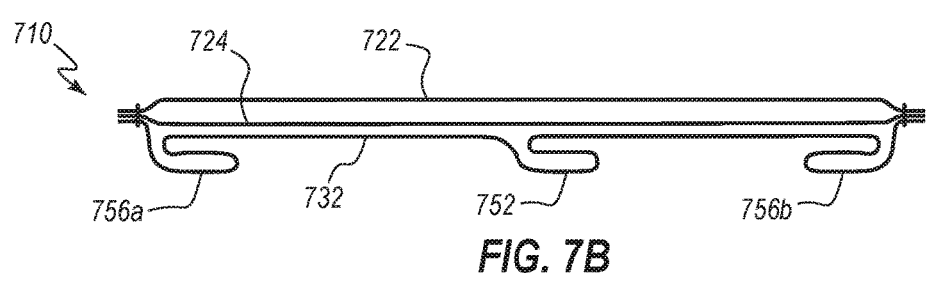
FIG. 7B is an angled top view of the airbag cushion of FIG. 7A with the airbag cushion in an uninflated, pre-installed state.

FIG. 7B is an angled top view of the airbag cushion 710 of FIG. 7A with the airbag cushion 710 in an uninflated, pre-installed state. The angle of view of FIG. 7B is similar to that of FIG. 1D (identified on FIG. 1B as 1D-1D). A vehicle-facing panel 722 and an occupant-facing panel 724 are shown for reference. FIG. 7B shows one possible fold configuration for each of the pleat folds 752, 756a and 756b relative to the external chamber panel 732. Other fold configurations are possible. For example, while FIG. 7B shows the center pleat fold 752 folded in one direction, the center pleat fold 752 could be folded in another direction, or could be folded in multiple directions. Similarly, either lateral pleat fold 756a, 756b could be folded in a direction other than shown, or in multiple directions. While FIG. 7B illustrates the pleat folds 752, 756a and 756b each as a single fold of the external chamber panel 732, each pleat fold 752, 756a, 756b may be formed of multiple folds or pleats.

Figure 7C:
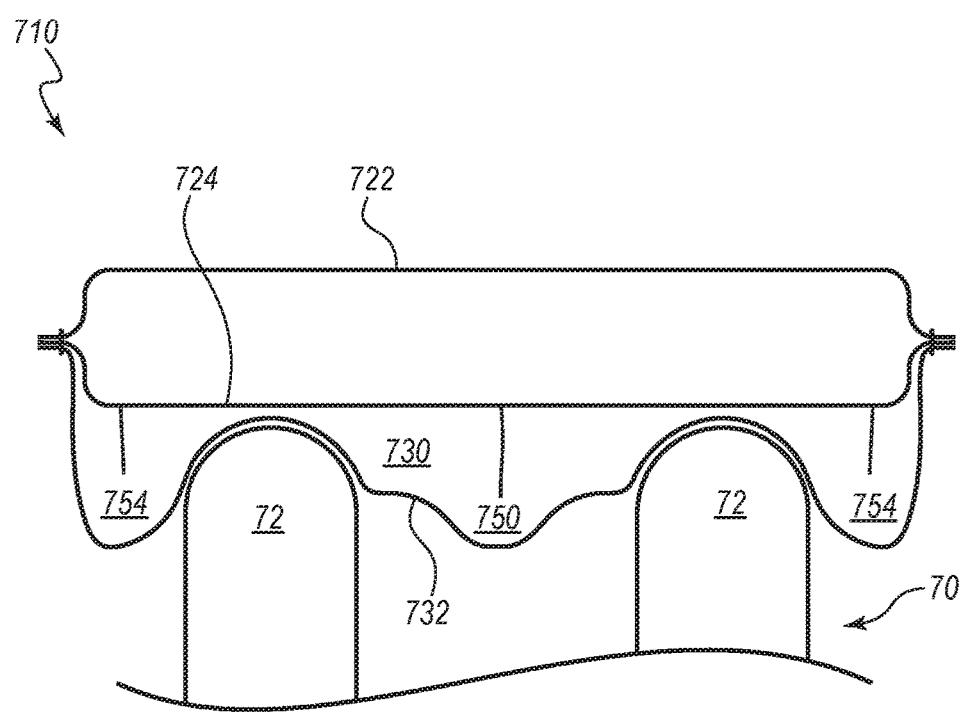
FIG. 7C is an angled top view of the airbag cushion of FIG. 7A with the airbag cushion deployed and at least partially inflated, with the supplemental chamber and pleat bubbles at least partially inflated.

FIG. 7C is a partial angled top view of the airbag cushion 710 of FIG. 7A with the airbag cushion 710 deployed and at least partially inflated, with the supplemental chamber 730 and pleat bubbles 750, 754 at least partially inflated. The vehicle-facing panel 722 and the occupant-facing panel 724 are shown for reference. In the embodiment of FIGS. 7A, 7B and 7C, the pleat folds 752, 756a, 756b are formed of material contiguous to the external chamber panel 732. As the supplemental chamber 730 inflates, the pleat bubbles 750, 754 may simultaneously inflate such that the pleat bubbles 750, 754 extend farther rearward in a fashion similar to the bubbles 650, 654 of FIG. 6B) described above. The pleat bubbles 750, 754 may prevent or limit lateral movement of the lower legs 72 or knees, or rolling of the ankles, of the occupant 70 during a collision event, particularly in an oblique collision event.

While FIGS. 7A, 7B and 7C depict an embodiment with three pleat bubbles 750, 754, another embodiment may omit the lateral pleat bubbles 754. Other arrangements of pleat bubbles are also possible.

Figure 8:
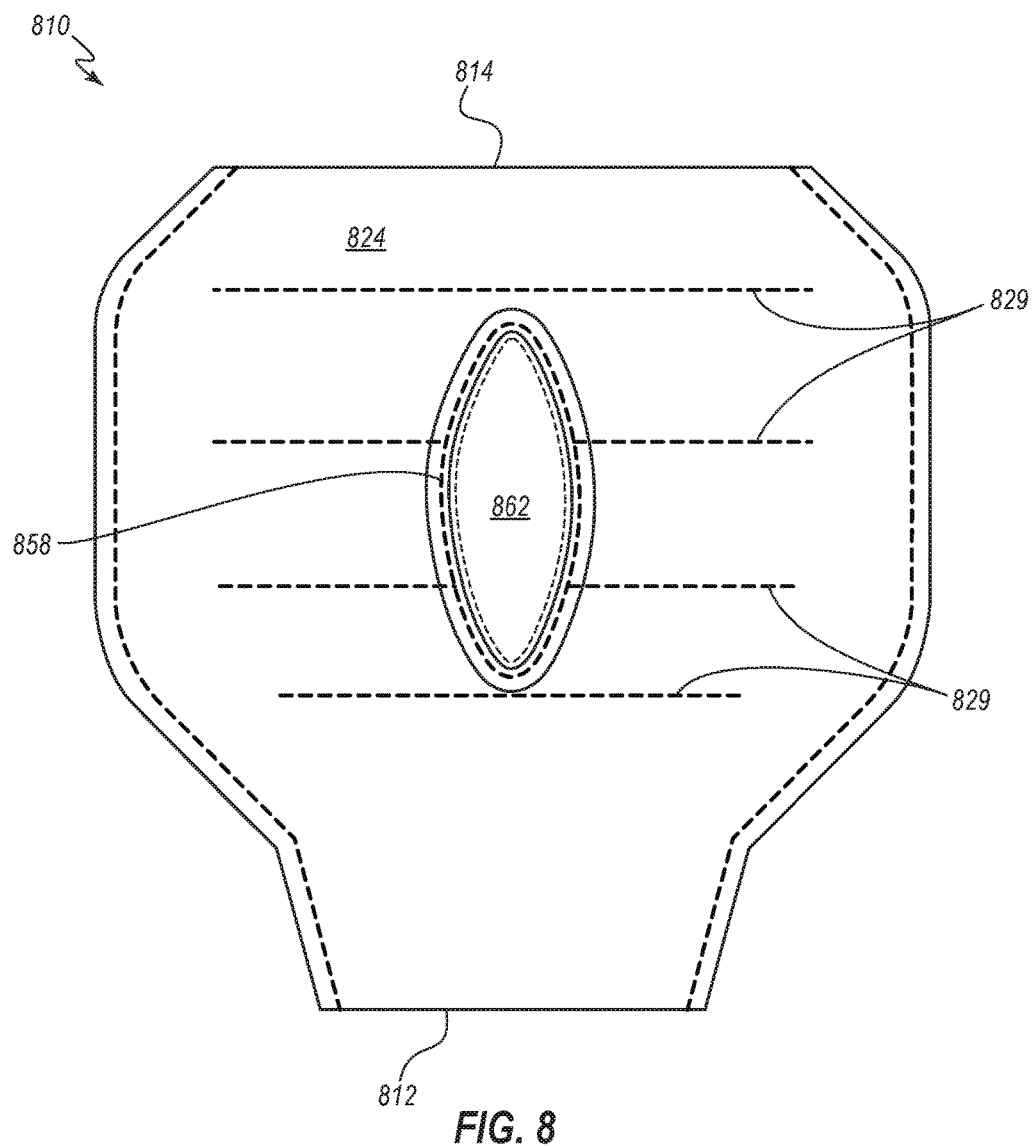
FIG. 8 is a top view of a pre-installation airbag cushion of an airbag assembly, according to another embodiment, and including a vertically oriented external chamber panel coupled to the occupant-facing panel.

FIG. 8 is a top view of a pre-installation airbag cushion 810 of an airbag assembly, according to another embodiment, and including a vertically oriented external chamber panel 862 coupled to an occupant-facing panel 824. The airbag cushion 810 is viewed as if it were laid out on a flat surface such as, for example, a tabletop or floor. A proximal end 812 of the airbag cushion 810 is shown near the bottom of the drawing of FIG. 8, and a distal end 814 of the airbag cushion 810 is shown near the top of the drawing of FIG. 8. The airbag cushion 810 may enclose one or more internal tethers (co-located to a plurality of tether couplings 829). The internal tether(s) couple(s) to an internal surface of the occupant-facing panel 824 at the tether coupling(s) 829.

The external chamber panel 862 may have the shape of a prolate spheroid, or, in other words, the general shape of an almond or football (American style). The external chamber panel 862 couples to an exterior surface of the occupant-facing panel 824 at an external chamber panel coupling 858. The external chamber panel 862 is disposed at or near a lateral center of the airbag cushion 810. The external chamber panel 862 may overlay a portion of one or more tether coupling(s) 829. The external chamber panel 862 is configured so as to extend farther rearward (relative to the vehicle) than adjacent regions of the occupant-facing panel 824 (see 830 in FIGS. 9A and 9B).

Figure 9A:
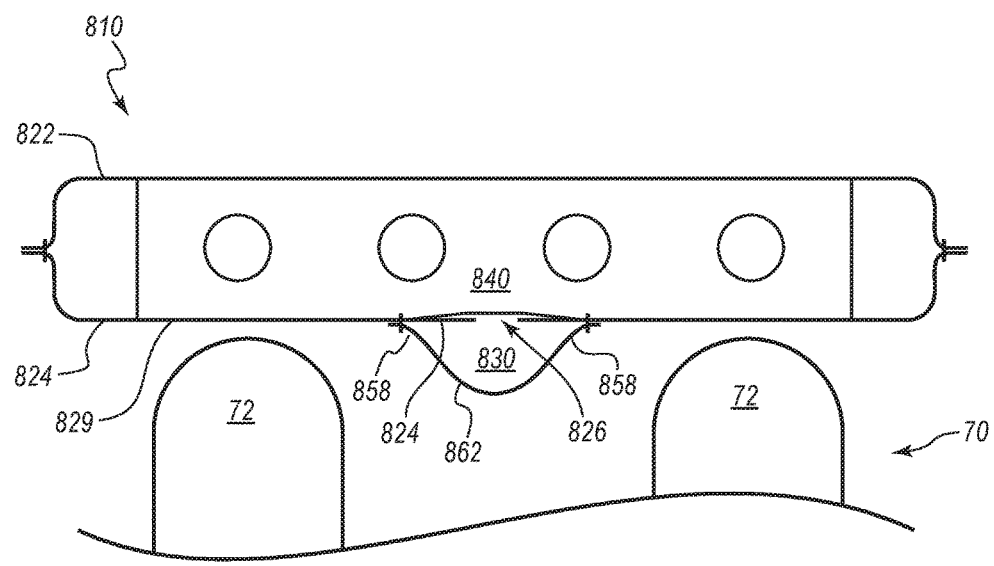
FIG. 9A is an angled top view of the airbag cushion of FIG. 8 with the airbag cushion deployed and at least partially inflated, and with a supplemental chamber at least partially inflated.

FIG. 9A is an angled top view of the airbag cushion 810 of FIG. 8 with the airbag cushion 810 deployed and at least partially inflated, with a supplemental chamber 830 at least partially inflated. The angle of view of FIG. 9A is similar to that of FIG. 1D (and identified on FIG. 1B as 1D-1D). One or more internal tether(s) 840 may be disposed between the vehicle-facing panel 822 and the occupant-facing panel 824, as described elsewhere herein. The internal tether(s) 840 may assist in conforming the airbag cushion 810 to the space between the vehicle structure and the lower leg(s) 72 of the occupant 70. In the embodiment of FIG. 9A, the internal tether(s) 840 may couple to an interior surface of the occupant-facing panel 824 at a plurality of tether coupling(s) 829 along the entire lateral width of the internal tether(s) 840.

The supplemental chamber 830 is formed by an external chamber panel 862. The external chamber panel 862 couples to the occupant-facing panel 824 at an external chamber panel coupling 858. Within the region of the occupant-facing panel 824 overlain by the external chamber panel 862, the occupant-facing panel 824 may include one or more vent(s) 826 to provide fluid communication of inflation gas to the supplemental chamber 830. The vent(s) of the occupant-facing panel 824 may control the timing of the inflation of the supplemental chamber 830 as disclosed elsewhere herein. The supplemental chamber 830 extends vertically along the occupant-facing panel 824 to be positioned and configured between the lower legs 72 of the occupant 70. The supplemental chamber 830 may prevent or limit lateral movement of the lower leg(s) 72, rolling of the ankles, of the occupant 70 in a collision event, particularly in an oblique collision event, thereby reducing or preventing injury to the lower leg(s) 72 and ankles of the occupant 70.

Figure 9B:
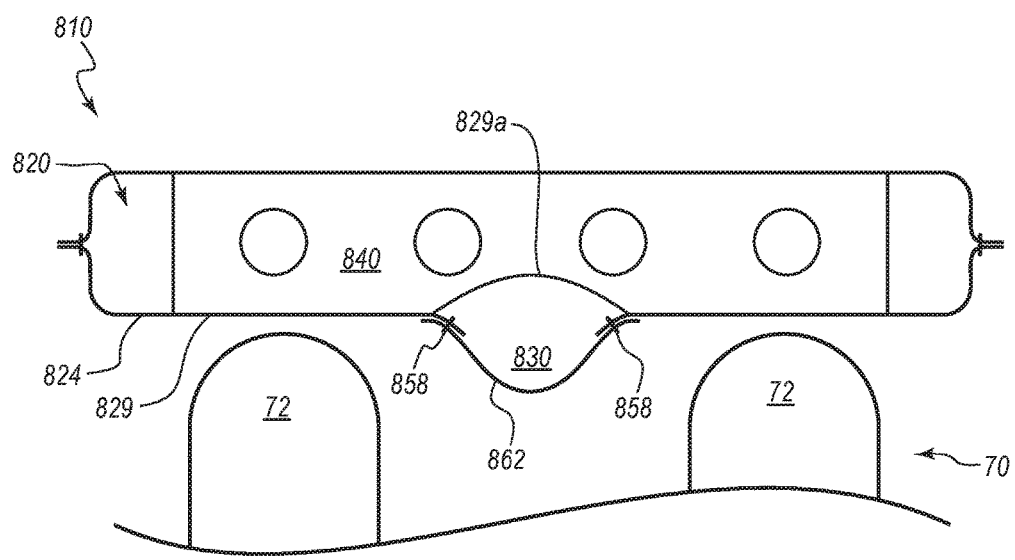
FIG. 9B is an angled top view of another embodiment of an airbag cushion of an airbag assembly, according to another embodiment, with the airbag cushion deployed and at least partially inflated, and with the supplemental chamber at least partially inflated.

FIG. 9B is an angled top view of the airbag cushion 810 of FIG. 8, according to another embodiment, with the airbag cushion 810 deployed and at least partially inflated, and with the supplemental chamber 830 at least partially inflated. The angle of view of FIG. 9B is similar to that of FIG. 1D (identified on FIG. 1B as 1D-1D). The supplemental chamber 830 is formed by the external chamber panel 862. The external chamber panel 862 couples to the occupant-facing panel 824 at the external chamber panel coupling 858. In the embodiment of FIG. 9B, the occupant-facing panel 824, rather than implementing (a) vent(s) to communicate inflation gas to the supplemental chamber 830, may have an aperture or opening underlying the entire (or substantially the entire) region of the occupant-facing panel 824 overlain by the external chamber panel 862. In other words, the region of the occupant-facing panel 824 circumscribed by the external chamber panel coupling 858 may comprise an opening within the occupant-facing panel 824 (see the external chamber panel coupling 858 of FIG. 9A).

The internal tether(s) 840 couple(s) to an internal surface of the occupant-facing panel 824 at the tether coupling(s) 829. In the embodiment of FIG. 9B, the tether coupling(s) 829 which are partially overlain by the external chamber panel 862 may not be continuous across the lateral width of the internal tether(s) 840, but may include a discontinuity 829a, or gap, comporting to the opening within the occupant-facing panel 824 overlain by the external chamber panel 862 and circumscribed by the external chamber panel coupling 858. In the embodiment of FIG. 9B, the supplemental chamber 830 may inflate more or less simultaneously with the main chamber 820 of the airbag cushion 810.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element.

It will be apparent to those having skill in the art that changes may be made to the details of the above-described embodiments without departing from the underlying principles of the present disclosure. Embodiments of the disclosure in which an exclusive property or privilege is claimed are defined as follows.

The invention claimed is:

1. An airbag assembly comprising:
a housing to be mounted in a vehicle;
an inflatable knee airbag in a packaged state within the housing, the airbag to receive inflation gas to expand and deploy from the housing to a deployed state, the airbag comprising:
a vehicle-facing panel;
an occupant-facing panel coupled to the vehicle-facing panel to form a main inflatable chamber that provides a primary cushioning protection zone to a lower leg of an occupant of the vehicle, the occupant-facing panel and the vehicle-facing panel further coupled by a first tether extending substantially laterally along a width of the main inflatable chamber, wherein the first tether is offset from an upper portion of the occupant-facing panel in the deployed state;
an external chamber panel coupled to a rearward surface of the occupant-facing panel external to the main inflatable chamber to form an external inflatable chamber facing the occupant, wherein an upper portion of the external chamber is coupled to the occupant-facing panel beneath the first tether in the deployed state; and
one or more vents disposed through the occupant-facing panel to provide fluid communication between the main inflatable chamber and the external inflatable chamber and to communicate inflation gas from the main inflatable chamber to the external chamber,
wherein the one or more vents control timing of inflation of the external chamber to inflate the main inflatable chamber to fill a space between the vehicle and the lower leg of the occupant, and
wherein the one or more vents control timing of inflation of the external chamber to cause the external chamber to inflate on lateral sides of the lower leg of the occupant to limit lateral movement of the lower leg relative to the vehicle.

2. The airbag assembly of claim 1, wherein the one or more vents control timing of inflation of the external chamber to cause the external chamber to begin inflating as the lower leg of the occupant begins to impact the inflatable knee airbag, such that the external chamber conforms to a forward portion of the lower leg of the occupant.

3. The airbag assembly of claim 1, wherein the external chamber panel is positioned on the occupant-facing panel so as to overlay only a single main inflatable chamber.

4. The airbag assembly of claim 1, wherein the external chamber panel extends horizontally from a first lateral edge of the occupant-facing panel to a second lateral edge of the occupant-facing panel.

5. The airbag assembly of claim 1, wherein the external chamber panel comprises a plurality of sections attached together, wherein at least a first section of the plurality of sections is configured to extend rearward farther than an adjacent portion of another section of the plurality of sections.

6. The airbag assembly of claim 5, wherein the first section of the plurality of sections of the external chamber panel comprises an almond-shaped section.

7. The airbag assembly of claim 6, wherein the almond-shaped section is disposed between and attached to two lateral sections of the plurality of sections of the external chamber panel.

8. The airbag assembly of claim 5, wherein the plurality of sections of the external chamber panel includes a plurality of almond-shaped sections.

9. The airbag assembly of claim 1, wherein the external chamber panel extends vertically along the occupant-facing panel to be disposed between the lower legs of the occupant.

10. The airbag assembly of claim 1, wherein the external chamber panel comprises one or more bubbles configured to expand to form a rearward protrusion in a rearward surface of the external chamber panel upon inflation of the external chamber panel in the deployed state.

11. An inflatable knee airbag configured to deploy from a component of a vehicle at a position below a knee position of a vehicle seating position, wherein the inflatable knee airbag comprises:
- a first panel to deploy to be positioned facing the vehicle seating position;
- a second panel to deploy to be positioned facing opposite the vehicle seating position and in a direction of the component of the vehicle, the second panel coupled to the first panel to define a main inflatable chamber of the inflatable knee airbag, the first and second panels further coupled by a first tether extending substantially laterally along a width of the main inflatable chamber, wherein the first tether is offset from an upper portion of the second panel in the deployed state;
- an external panel coupled to an external surface of the first panel to form a supplemental inflatable chamber, wherein an upper portion of the external panel is coupled to the second panel beneath the first tether in the deployed state; and
- one or more vents disposed through the first panel to communicate inflation gas from the main inflatable chamber to the supplemental inflatable chamber,
- wherein the one or more vents are configured to control timing of communication of inflation gas to inflate the main inflatable chamber to fill a space between the vehicle and a lower leg of an occupant before occupant impact with the inflatable knee airbag and to inflate the supplemental chamber to form around a portion of the lower leg of the occupant.

12. The inflatable knee airbag of claim 11, wherein the one or more vents control timing of inflation of the supplemental chamber to cause the inflation of the supplemental chamber to begin as the lower leg begins to impact the inflatable knee airbag.

13. The inflatable knee airbag of claim 11, wherein the external panel is positioned on the first panel so as to overlay only the main inflatable chamber.

14. The inflatable knee airbag of claim 11, wherein the main inflatable chamber is to provide a cushioning protection zone to an occupant of the vehicle, the cushioning protection zone to provide primary cushioning protection for a lower leg of the occupant, and wherein the supplemental chamber is to limit lateral movement of the lower leg relative to the vehicle.

15. The inflatable knee airbag of claim 11, wherein the external panel is positioned on the first panel so as to be at least partially superimposed on a plurality of internal tethers within the main inflatable chamber.

16. The inflatable knee airbag of claim 11, wherein the external panel comprises a plurality of discrete sections attached together, wherein at least a first section of the plurality of sections is configured to extend rearward farther away from the first panel than an adjacent portion of another section of the plurality of sections.

17. The inflatable knee airbag of claim 16, wherein the first section of the plurality of sections of the external panel comprises a vesica piscis shaped section.

18. The inflatable knee airbag of claim 17, wherein the vesica piscis shaped section is disposed between and attached to two opposing lateral sections of the plurality of sections of the external chamber panel.

19. The inflatable knee airbag of claim 18, wherein the two lateral sections each include a first side with a length similar to a length of a perimeter of a corresponding side of the almond-shaped section, and wherein the first side of each of the lateral sections is attached along the perimeter of the corresponding side of the almond-shaped section.

20. The inflatable knee airbag of claim 11, wherein the external panel comprises one or more bubbles configured to expand upon inflation to extend rearward farther than portions of the external panel adjacent the one or more bubbles.

* * * * *